US006462161B1

(12) United States Patent
Cady et al.

(10) Patent No.: US 6,462,161 B1
(45) Date of Patent: *Oct. 8, 2002

(54) POLYOLEFIN COMPOSITION WITH MOLECULAR WEIGHT MAXIMUM OCCURRING IN THAT PART OF THE COMPOSITION THAT HAS THE HIGHEST COMONOMER CONTENT

(75) Inventors: Larry D. Cady, Houston, TX (US); Christopher J. Frye, Bouc Bel Air (FR); Philip Howard, Teddington (GB); Teresa P. Karjala, Lake Jackson, TX (US); Peter J. Maddox, Martigues (FR); Ian M. Munro, Lake Jackson, TX (US); Deepak R. Parikh, Lake Jackson, TX (US); S. Roy Partington, Walton-On-Thames (GB); Kevin P. Peil, Auburn, MI (US); Lee Spencer, Pearland, TX (US); William R. Van Volkenburgh, Lake Jackson, TX (US); Peter S. Williams, Route De Galice (FR); David R. Wilson, Midland, MI (US); J. Mark Winter, Lake Jackson, TX (US)

(73) Assignee: BP Chemicals Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,414

(22) PCT Filed: May 16, 1997

(86) PCT No.: PCT/US97/08206

§ 371 (c)(1),
(2), (4) Date: Nov. 6, 1998

(87) PCT Pub. No.: WO97/44371

PCT Pub. Date: Nov. 27, 1997

Related U.S. Application Data

(60) Provisional application No. 60/017,147, filed on May 17, 1996.

(51) Int. Cl.⁷ .......................... C08F 10/02; C08F 10/06; C08F 4/44; C08F 210/04
(52) U.S. Cl. ...................... 526/348; 526/160; 526/161; 526/348.6; 526/348.5; 526/916; 526/943; 526/347; 526/901; 526/352
(58) Field of Search ................................. 526/160, 161, 526/943, 348.6, 348, 916, 347, 901

(56) References Cited

U.S. PATENT DOCUMENTS

| | | | | | |
|---|---|---|---|---|---|
| 5,281,679 A | * | 1/1994 | Jejelowo et al. | ............. | 526/114 |
| 5,631,391 A | * | 5/1997 | Canich | ......................... | 556/11 |
| 5,703,187 A | * | 12/1997 | Timmers | ..................... | 526/282 |

FOREIGN PATENT DOCUMENTS

| | | | |
|---|---|---|---|
| EP | 0 659 773 A1 | * | 6/1995 |
| EP | 0 705 849 A1 | * | 4/1996 |
| WO | WO 94/03509 | * | 2/1994 |

* cited by examiner

Primary Examiner—David W. Wu
Assistant Examiner—R. Harlan
(74) Attorney, Agent, or Firm—Finnegan, Henderson, Farabow, Garrett and Dunner, L.L.P.

(57) ABSTRACT

The invention relates to a polyolefin copolymer composition produced with a catalyst having a metallocene, complex in a single reactor for the polymer of an $\alpha$-olefin monomer with one or more olefin comonomers, and a molecule weight maximum which occurs in that 50 percent by weight of the composition which has the highest weight percent comonomer content. Preferably, the composition has a comonomer partitioning fact $C_{pf}$ which is equal to or greater than 1.10 or molecule weight partitioning fact $M_{pf}$ which is equal to or greater than 1.15. Preferred composition also have at least 0.01 long chain branches per 1000 carbon atoms along the polymer backbone. These compositions with reverse molecular engineering have. superior properties and are easily processable due to the simultaneous presence of the association of high molecular weight with high comonomer content and of long chain branching.

50 Claims, 14 Drawing Sheets

POLYOLEFIN COMPOSITION WITH MOLECULAR WEIGHT MAXIMUM OCCURRING IN THAT PART OF THE COMPOSITION THAT HAS THE HIGHEST COMONOMER CONTENT

RELATED APPLICATIONS

This application is the national phase of International Application No. PCT/US97/08206 filed May 16, 1997 and claims priority of provisional Application Serial No. 60/017,147, filed May 17, 1996.

FIELD OF THE INVENTION

This invention relates to polyolefin copolymer compositions with the molecular weight maximum occurring in that part of the composition that has the highest comonomer content, and, preferably, with long chain branching, which have been produced from an α-olefin monomer and one or more α-olefin comonomers in a single reactor with a single metallocene catalyst, and to processes for the production of these materials and the catalysts used therefor.

BACKGROUND OF THE INVENTION

Recently there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD). By narrow SCBD, it is meant that the frequency of short chain branches, formed where comonomers incorporate into the polyolefin chain, is relatively independent of molecular weight. Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

An approach to improving processability has been the inclusion of long chain branching (LCB), which is particularly desirable from the viewpoint of improving processability without damaging advantageous properties. U.S. Pat. No. 's 5,272,236; 5,278,272; 5,380,810; and EP 659,773, EP 676,421, WO 94/07930 relate to the production of polyolefins with long chain branching.

Another approach is the addition of the polymer processing aids to the polymer prior to fabrication into films or articles. This requires extra processing and is expensive.

A different approach to the problem has been to make compositions which are blends or mixtures of individual polymeric materials with the goal being to maximize the beneficial properties while minimizing the processing problems. This requires extra processing which increases the cost of materials produced. U.S. Pat. Nos. 4,598,128; 4,547,551; 5,408,004; 5,382,630; 5,382,631; and 5,326,602; and WO 94/22948 and WO 95/25141 relate to blends.

Another way to provide a solution for the processability problems and to vary SCBD has been the development of various cascade processes, where the material is produced by a series of polymerizations under different reactor conditions, such as in a series of reactors. Essentially, a material similar in some ways to a blend is produced, with a modality greater than one for various physical properties, such as the molecular weight distribution. While polyolefin compositions with superior processability characteristics can be produced this way, these methods are expensive and complicated relative to the use of a single reactor. Processes of interest are disclosed in U.S. Pat. No. 5,442,018, WO 95/26990, WO 95/07942 and WO 95/10548.

Another potentially feasible approach to improving processability and varying SCBD has been to use a multicomponent catalyst. In some cases, a catalyst which has a metallocene catalyst and a conventional Ziegler-Natta catalyst on the same support to produce a multimodal material, in other cases two metallocene catalysts have been used in polyolefin polymerizations. Components of different molecular weights and compositions are produced in a single reactor operating under a single set of polymerization conditions. This approach is difficult from the point of view of process control and catalyst preparation. Catalyst systems of interest are disclosed in WO 95/11264 and EP 676,418.

SUMMARY OF THE INVENTION

It would be desirable to be able to produce a polyolefin copolymer composition which has the molecular weight maximum occurring in that portion of the composition that has the highest number of short chain branches and which is very easy to process. Further, it would be desirable to be able to accomplish this using a single metallocene catalyst, preferably supported in a polymerization process using a single reactor, preferably gas phase, operating semi-continuously or, preferably, continuously under a single set of reactor conditions. It would be especially desirable to be able to produce a polyolefin copolymer composition which has the molecular weight maximum occurring in that portion of the composition that has the highest number of short chain branches and which has significant long chain branching.

The short chain branching distribution of a polyolefin composition, which is due to the incorporation of an α-olefin comonomer during the polymerization of an α-olefin monomer, can be examined by several techniques, such as, for example, ATREF-DV and GPC-FTIR. If the material of the composition is divided into portions starting at one end of the distribution or the other, the relationship between high short chain branching content due to high comonomer content and molecular weight can be determined.

In one embodiment this invention is a polyolefin copolymer composition produced with a catalyst having a metallocene complex in a single reactor in a process for the polymerization of an α-olefin monomer with one or more olefin comonomers, the composition having long chain branches along the polymer backbone and a molecular weight maximum which occurs in that 50 percent by weight of the composition which has the highest weight percent comonomer content.

A preferred embodiment of this invention is a polyolefin copolymer composition wherein the composition has a comonomer partitioning factor $C_{pf}$ which is equal to or greater than 1.10 or a molecular weight partitioning factor $M_{pf}$ which is equal to or greater than 1.15, or a comonomer partitioning factor $C_{pf}$ which is equal to or greater than 1.10 and a molecular weight partitioning factor $M_{pf}$ which is equal to or greater than 1.15, where the comonomer partitioning factor $C_{pf}$ is calculated from the equation:

$$C_{pf} = \frac{\dfrac{\sum_{i=1}^{n} w_i \cdot c_i}{\sum_{i=1}^{n} w_i}}{\dfrac{\sum_{j=1}^{m} w_j \cdot c_j}{\sum_{j=1}^{m} w_j}},$$

where $c_i$ is the mole fraction comonomer content and $w_i$ is the normalized weight fraction as determined by GPC/FTIR for the n FTIR data points above the median molecular weight, $c_j$ is the mole fraction comonomer content and $w_j$ is the normalized weight fraction as determined by GPC/FTIR for the m FTIR data points below the median molecular weight, wherein only those weight fractions $w_i$ or $w_j$ which have associated mole fraction comonomer content values are used to calculate $C_{pf}$ and n and m are greater than or equal to 3; and where the molecular weight partitioning factor $M_{pf}$ is calculated from the equation:

$$M_{pf} = \frac{\dfrac{\sum_{i=1}^{n} w_i \cdot M_i}{\sum_{i=1}^{n} w_i}}{\dfrac{\sum_{j=1}^{m} w_j \cdot M_j}{\sum_{j=1}^{m} w_j}},$$

where $M_i$ is the viscosity average molecular weight and $w_i$ is the normalized weight fraction as determined by ATREF-DV for the n data points in the fractions below the median elution temperature, $M_j$ is the viscosity average molecular weight and $w_j$ is the normalized weight fraction as determined by ATREF-DV for the m data points in the fractions above the median elution temperature, wherein only those weight fractions, $w_i$ or $w_j$ which have associated viscosity average molecular weights greater than zero are used to calculate $M_{pf}$ and n and m are greater than or equal to 3.

In another embodiment this invention is a polyolefin copolymer composition produced with a catalyst having a metallocene complex in a single reactor in a continuous gas phase process for the polymerization of an α-olefin monomer with one or more olefin comonomers, the composition having a comonomer partitioning factor $C_{pf}$ which is equal to or greater than 1.10, or a molecular weight partitioning factor $M_{pf}$ which is equal to or greater than 1.15, or a comonomer partitioning factor $C_{pf}$ which is equal to or greater than 1.10 and a molecular weight partitioning factor $M_{pf}$ which is equal to or greater than 1.15, where the comonomer partitioning factor $C_{pf}$ and the molecular weight partitioning factor $M_{pf}$ are as previously defined.

In another embodiment the invention is a polyolefin copolymer composition produced with a catalyst having a bis-Cp metallocene complex in a single reactor in a process for the polymerization of an α-olefin monomer with one or more olefin comonomers, the composition having a comonomer partitioning factor $C_{pf}$ which is equal to or greater than 1.10, or a molecular weight partitioning factor $M_{pf}$ which is equal to or greater than 1.15, or a comonomer partitioning factor $C_{pf}$ which is equal to or greater than 1.10 and a molecular weight partitioning factor $M_{pf}$ which is equal to or greater than 1.15, where the comonomer partitioning factor $C_{pf}$ and the molecular weight partitioning factor $M_{pf}$ are as previously defined.

In a further embodiment this invention is a polyolefin copolymer composition produced with a catalyst having an organometallic compound in a single reactor in a process for the polymerization of an α-olefin monomer with one or more olefin comonomers, the composition having long chain branches along the polymer backbone and a molecular weight maximum which occurs in that 50 percent by weight of the composition which has the highest weight percent comonomer content.

Polymerization processes to provide the aforementioned compositions are within the scope of this invention and one embodiment is a process for the polymerization of an α-olefin monomer with one or more olefin comonomers using a metallocene catalyst in a single reactor, the composition having long chain branches along the polymer backbone and a molecular weight maximum which occurs in that 50 percent by weight of the composition which has the highest weight percent comonomer content. A preferred embodiment is that where the composition has a comonomer partitioning factor $C_{pf}$ which is equal to or greater than 1.10, or a molecular weight partitioning factor $M_{pf}$ which is equal to or greater than 1.15, or a comonomer partitioning factor $C_{pf}$ which is equal to or greater than 1.10 and a molecular weight partitioning factor $M_{pf}$ which is equal to or greater than 1.15, where the comonomer partitioning factor $C_{pf}$ and the molecular weight partitioning factor $M_{pf}$ are as previously defined.

Another embodiment of this invention is a continuous gas phase process for the polymerization of an α-olefin monomer with one or more olefin comonomers using a catalyst having a metallocene complex in a single reactor, the process producing a composition having a comonomer partitioning factor $C_{pf}$ which is equal to or greater than 1.10, or a molecular weight partitioning factor $M_{pf}$ which is equal to or greater than 1.15, or a comonomer partitioning factor $C_{pf}$ which is equal to or greater than 1.10 and a molecular weight partitioning factor $M_{pf}$ which is equal to or greater than 1.15, where the comonomer partitioning factor $C_{pf}$ and the molecular weight partitioning factor $M_{pf}$ are as previously defined.

Another embodiment of this invention is a process for the polymerization of an α-olefin monomer with one or more olefin comonomers using a catalyst having a bis-Cp metallocene complex in a single reactor, the process producing a composition having a comonomer partitioning factor $C_{pf}$ which is equal to or greater than 1.10, or a molecular weight partitioning factor $M_{pf}$ which is equal to or greater than 1.15, or a comonomer partitioning factor $C_{pf}$ which is equal to or greater than 1.10 and a molecular weight partitioning factor $M_{pf}$ which is equal to or greater than 1.15, where the comonomer partitioning factor $C_{pf}$ and the molecular weight partitioning factor $M_{pf}$ are as previously defined.

A further embodiment of this invention is a process for the polymerization of an α-olefin monomer with one or more olefin comonomers using a catalyst having an organometallic compound in a single reactor, the composition having long chain branches along the polymer backbone and a molecular weight maximum which occurs in that 50 percent by weight of the composition which has the highest weight percent comonomer content.

Another embodiment of this invention is a process for the polymerization of an α-olefin monomer with one or more olefin comonomers using a catalyst having an organometallic compound in a single reactor, the composition having long chain branches along the polymer backbone and a molecular weight maximum which occurs in that 50 percent by weight of the composition which has the highest weight percent comonomer content.

The compositions of this invention have desirable properties and can be easily processed into a film or other article of manufacture which has a melt strength of greater than 4 cN, or which has a seal strength of greater than 1.9 kg (4.2 lb.), or which has a hot tack greater than 0.23 kg (0.5 lb.), or which has a dart impact strength greater than 100 g.

A further embodiment of this invention relate to a blend of two or more resin components comprising:

(A) from about 1 weight percent to about 99 weight percent of a polyolefin copolymer composition produced with a catalyst having a metallocene complex in a single reactor in a process for the polymerization of an α-olefin monomer with one or more olefin comonomers, the composition having long chain branches along the polymer backbone and a molecular weight maximum which occurs in that 50 percent by weight of the composition which has the highest weight percent comonomer content; and (B) from about 99 weight percent to about 1 weight percent of one or more resins that are different from the (A) component.

Another embodiment of this invention is a blend of two or more resin components comprising:

(A) from about 1 weight percent to about 99 weight percent of a polyolefin copolymer composition produced with a catalyst having a metallocene complex in a single reactor in a continuous gas phase process for the polymerization of an α-olefin monomer with one or more olefin comonomers, the composition having a comonomer partitioning factor $C_{pf}$ which is equal to or greater than 1.10, or a molecular weight partitioning factor $M_{pf}$ which is equal to or greater than 1.15, or a comonomer partitioning factor $C_{pf}$ which is equal to or greater than 1.10 and a molecular weight partitioning factor $M_{pf}$ which is equal to or greater than 1.15, where the comonomer partitioning factor $C_{pf}$ and the molecular weight partitioning factor $M_{pf}$ are as previously defined; and (B) from about 99 weight percent to about 1 weight percent of one or more resins that are different from the (A) component.

Figure 1:
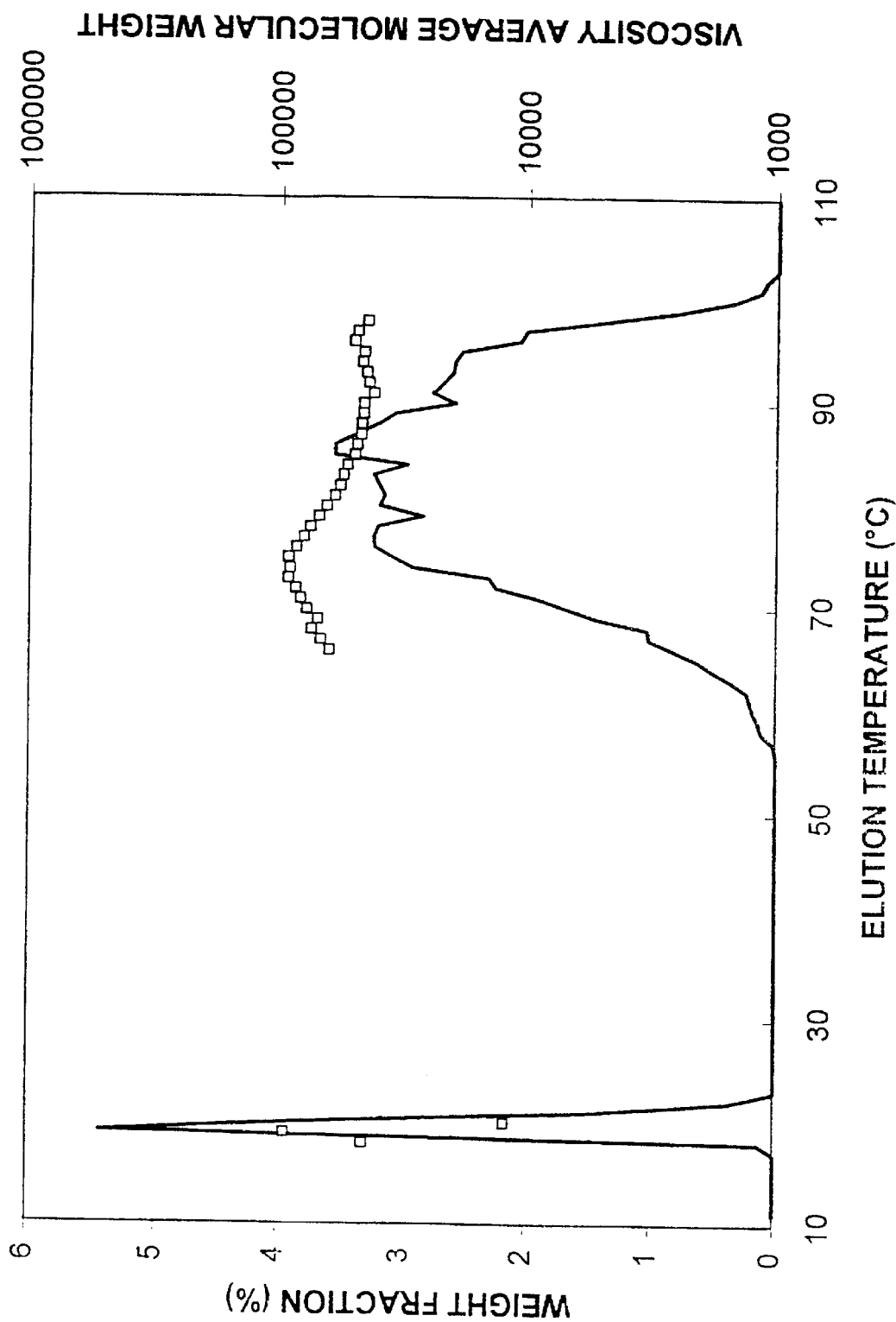
FIG. 1 is an ATREF-DV plot for the composition of Example 1.
Figure 2:
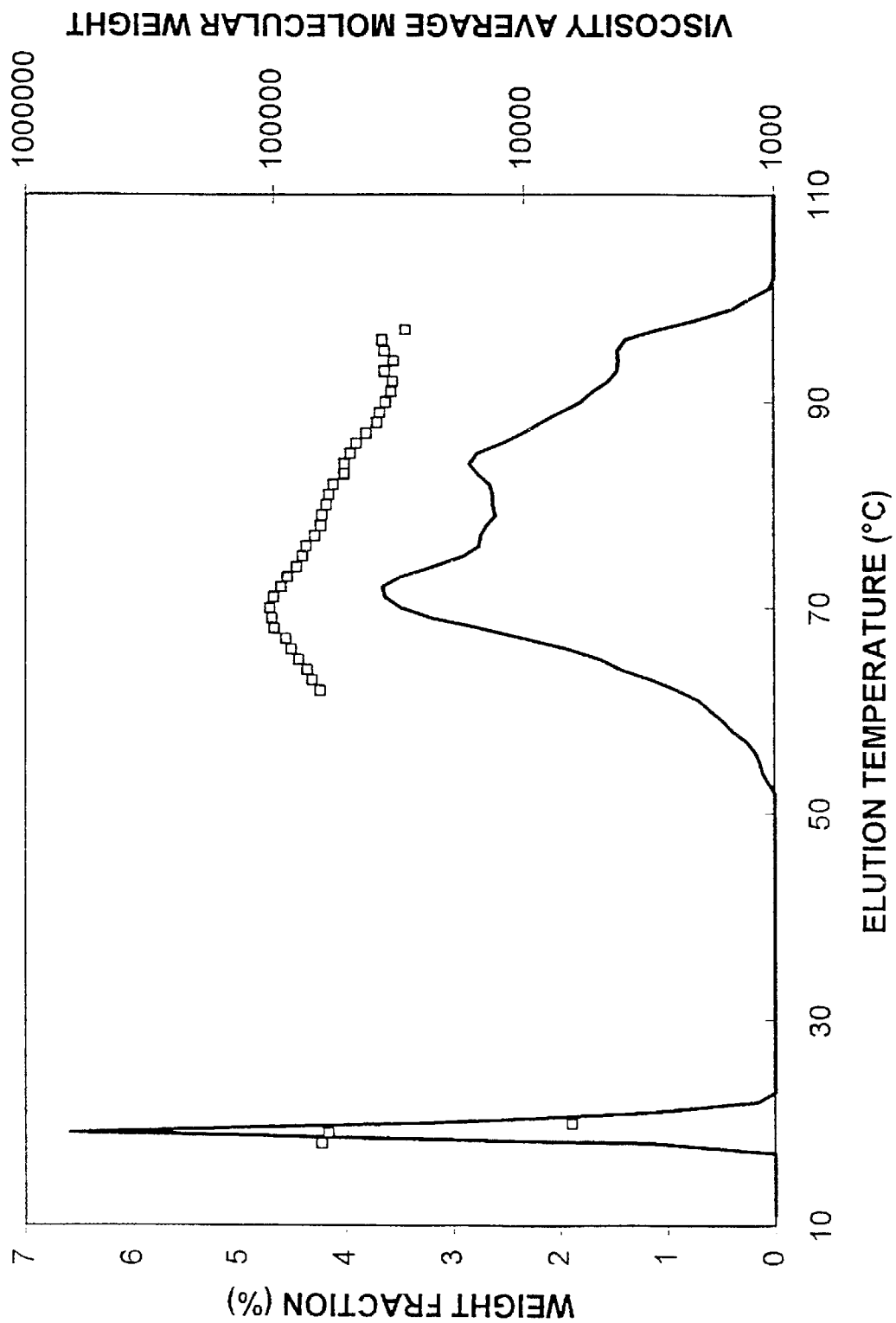
FIG. 2 is an ATREF-DV plot for the composition of Example 2.
Figure 3:
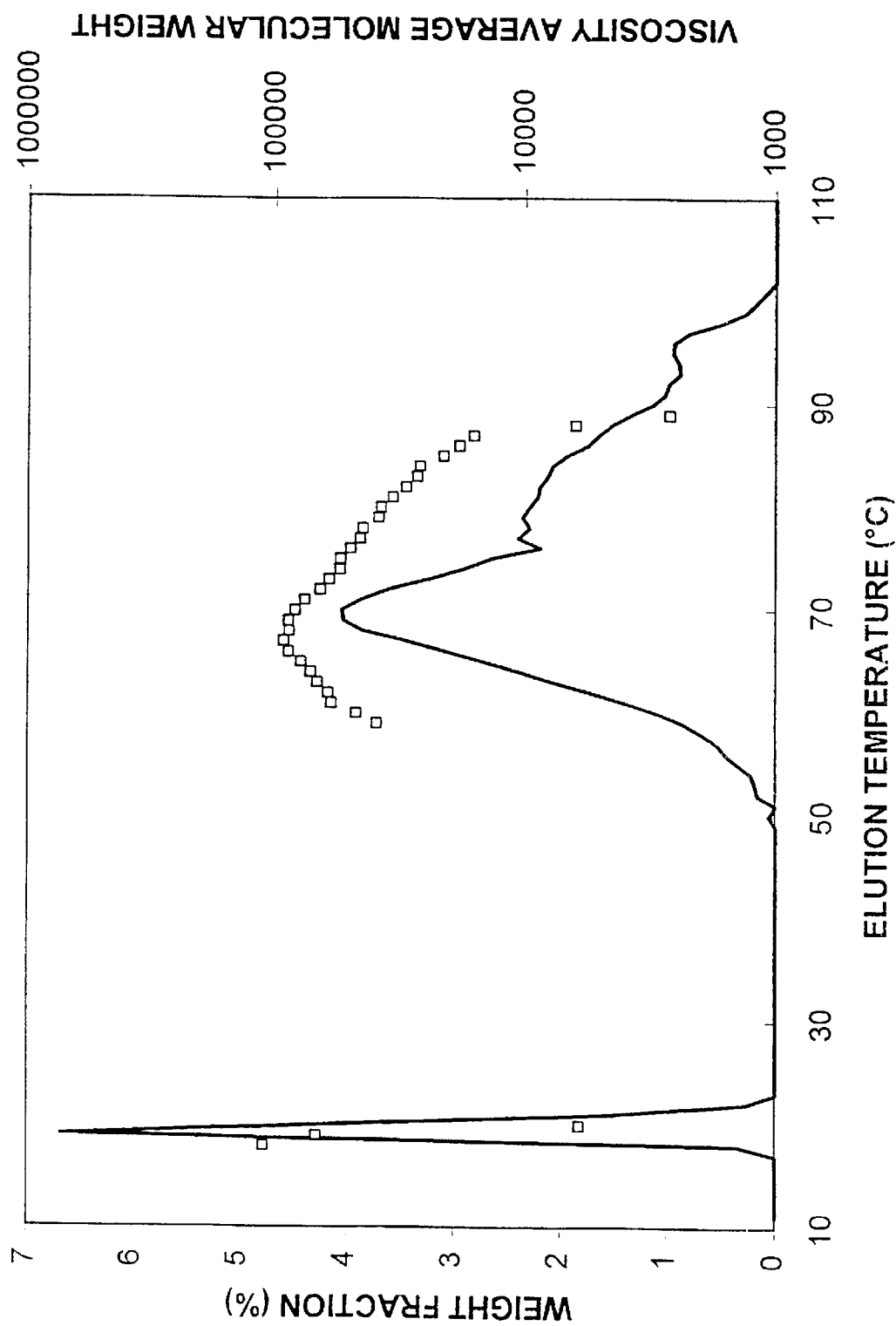
FIG. 3 is an ATREF-DV plot for the composition of Example 3.
Figure 4:
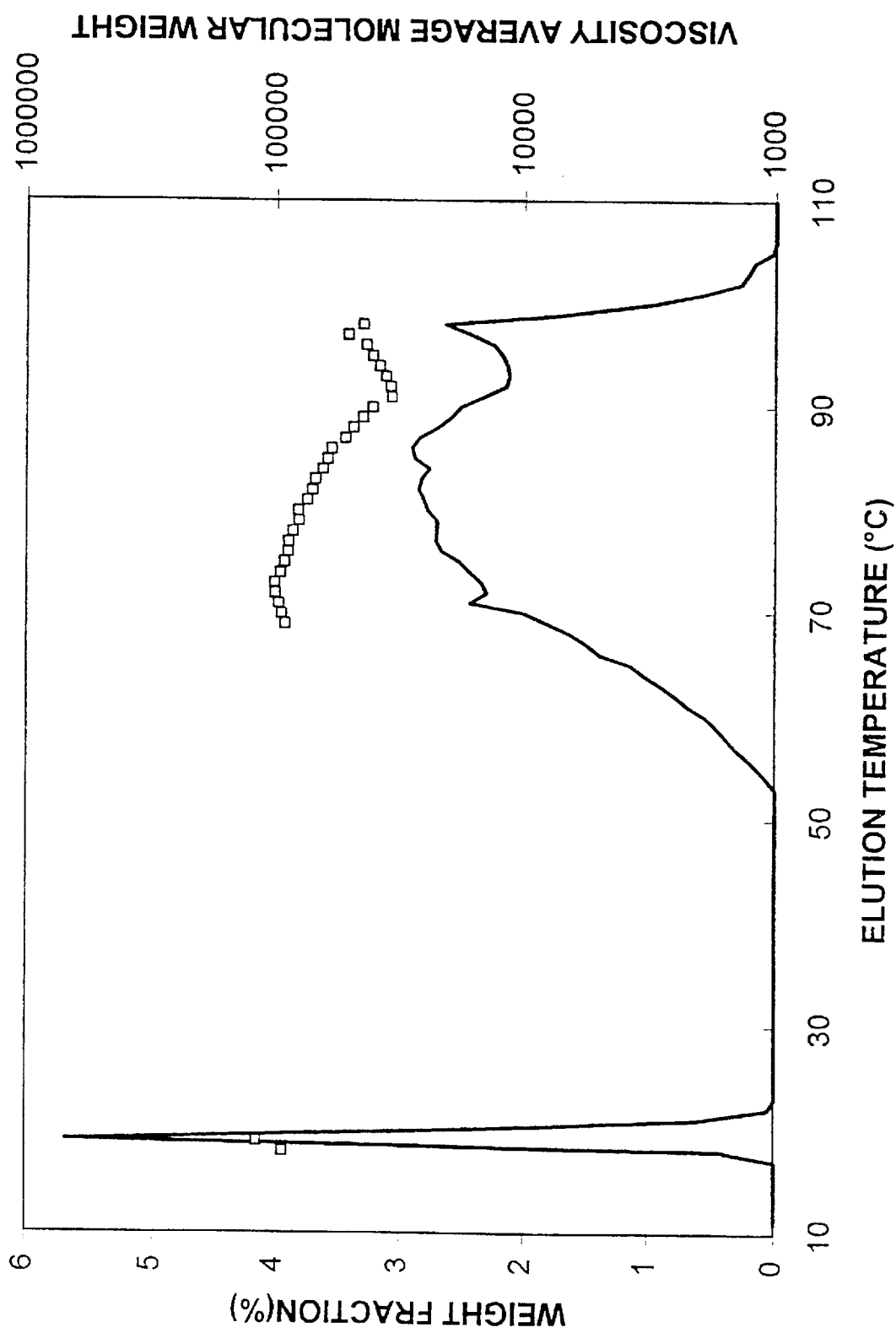
FIG. 4 is an ATREF-DV plot for the composition of Example 4.
Figure 5:
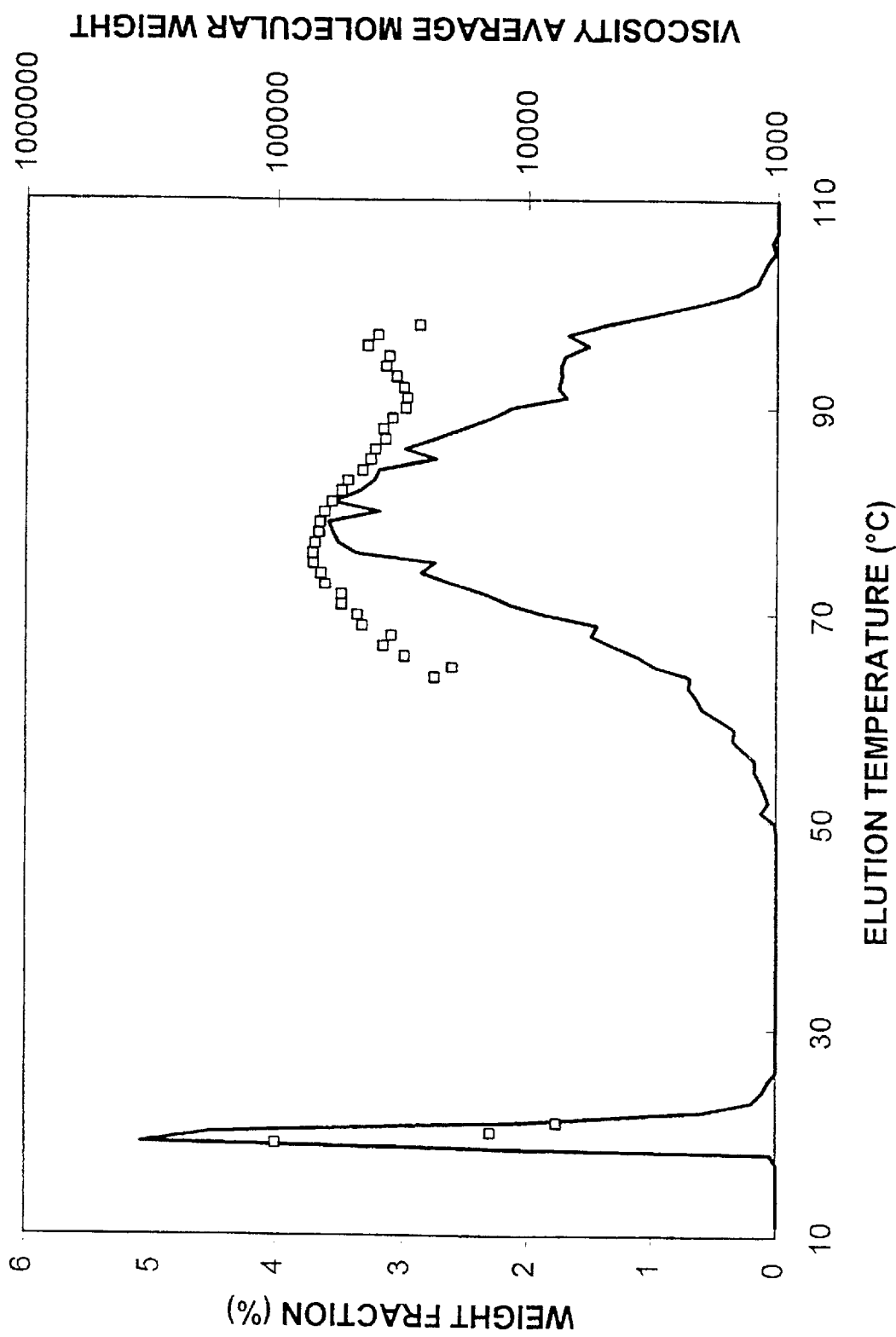
FIG. 5 is an ATREF-DV plot for the composition of Example 5.
Figure 6:
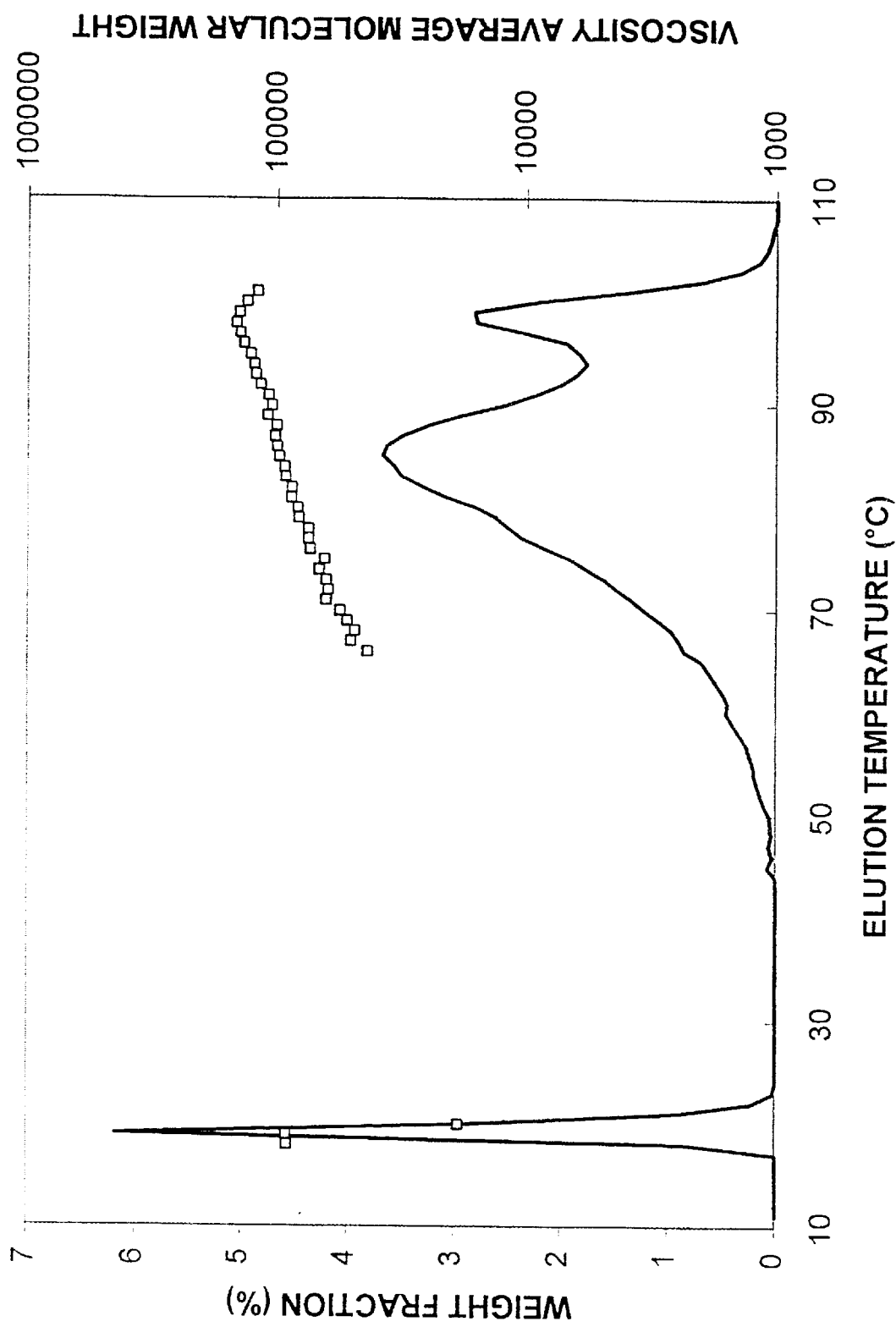
FIG. 6 is an ATREF-DV plot for the composition of Comparative Example D, DOWLEX™ 2056, a commercially available Ziegler-Natta produced polyethylene.
Figure 7:
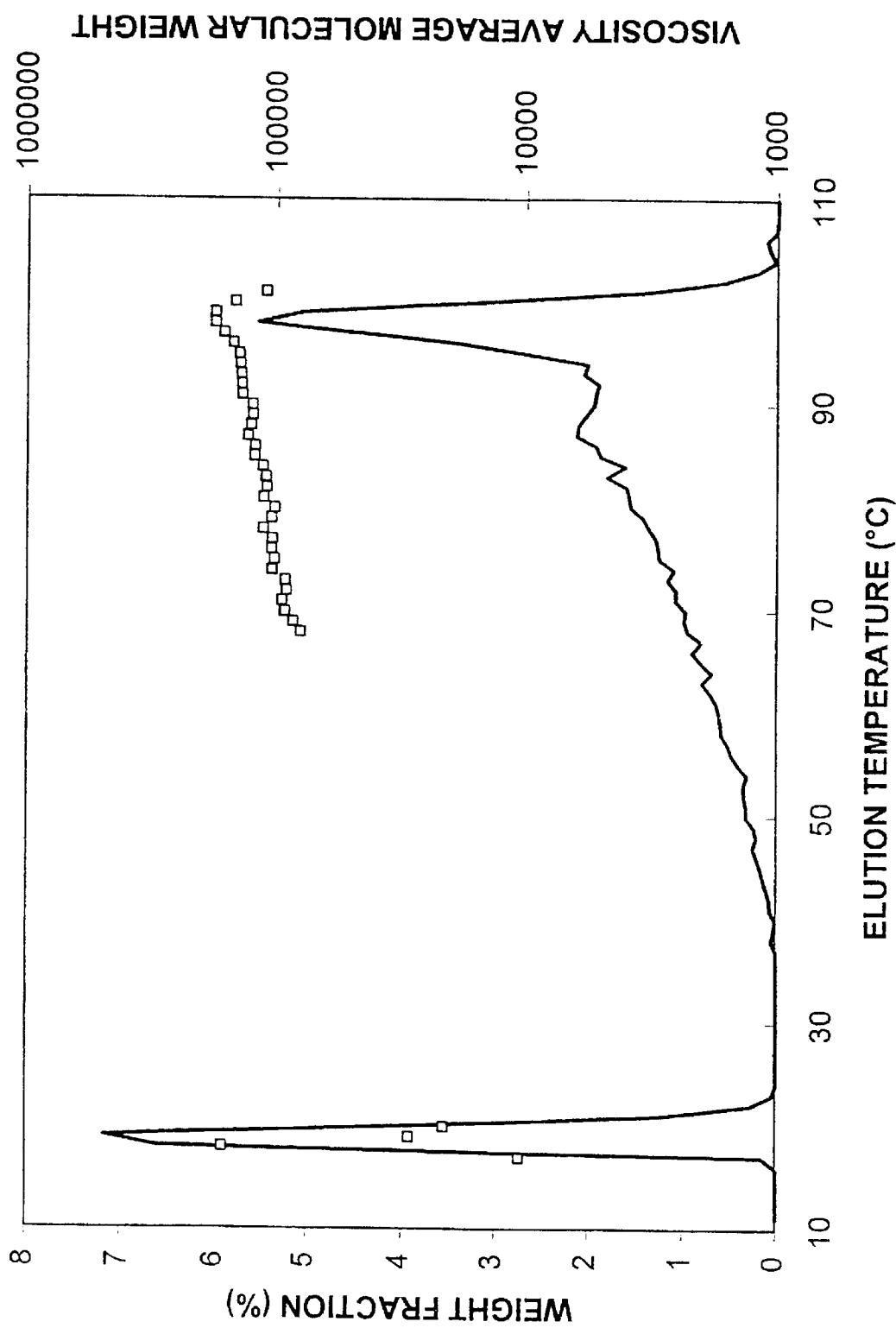
FIG. 7 is an ATREF-DV plot for the composition of Comparative Example A, BP Innovex™ 7209.
Figure 8:
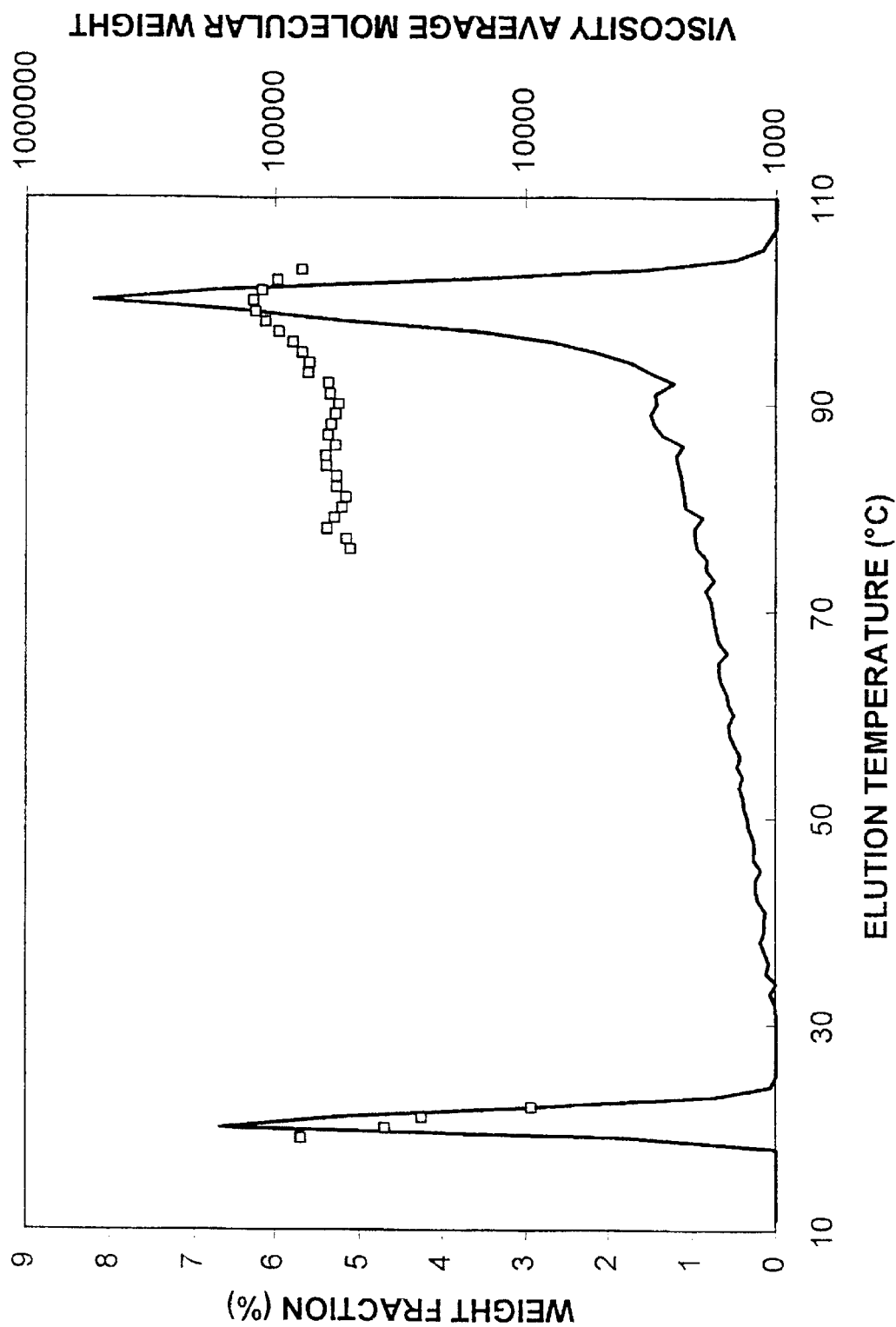
FIG. 8 is an ATREF-DV plot for the composition of Comparative Example B, Exxon Exceed™ 401.
Figure 9:
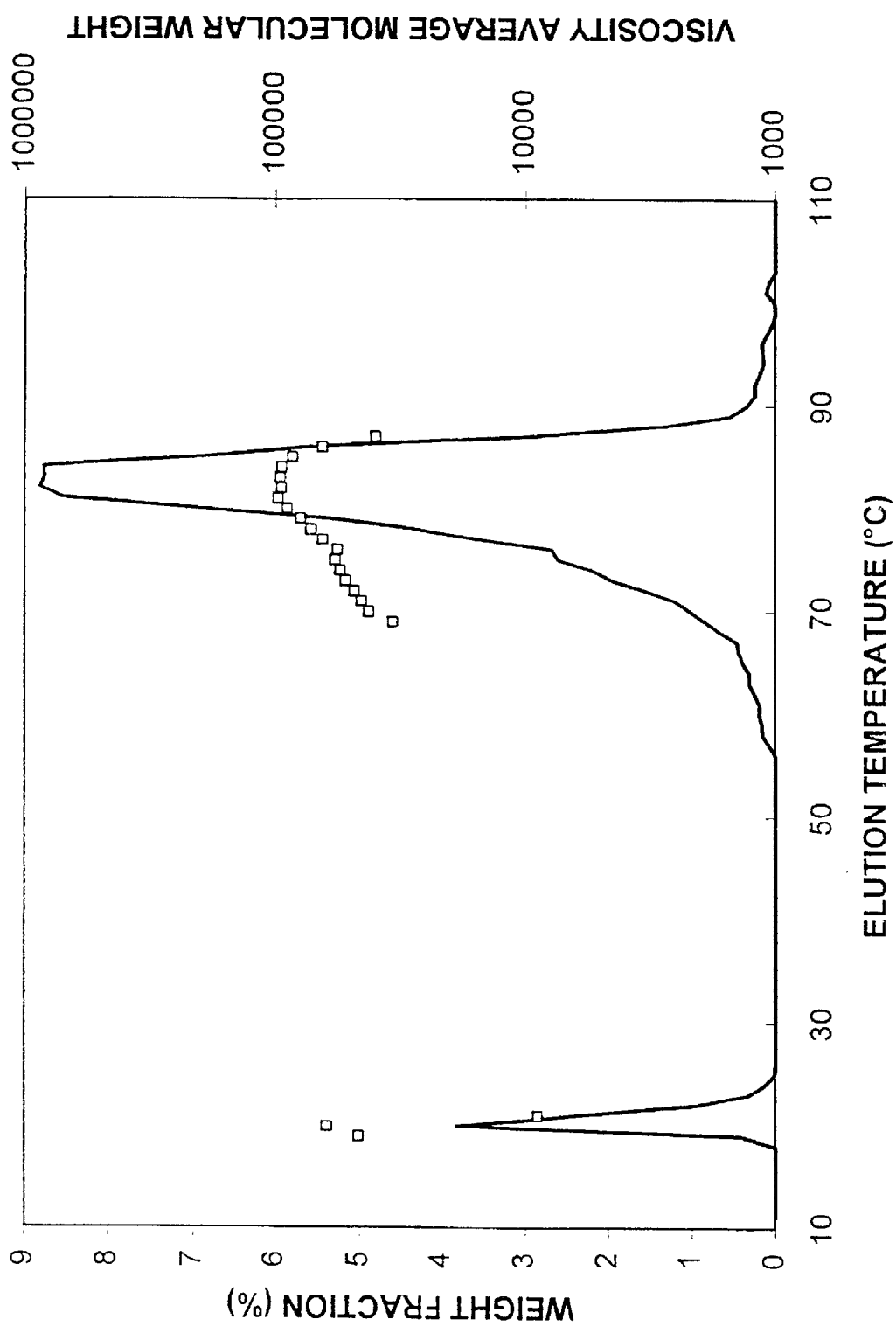
FIG. 9 is an ATREF-DV plot for the composition of Comparative Example E, solution INSITE™ metallocene produced AFFINITY™.
Figure 10:
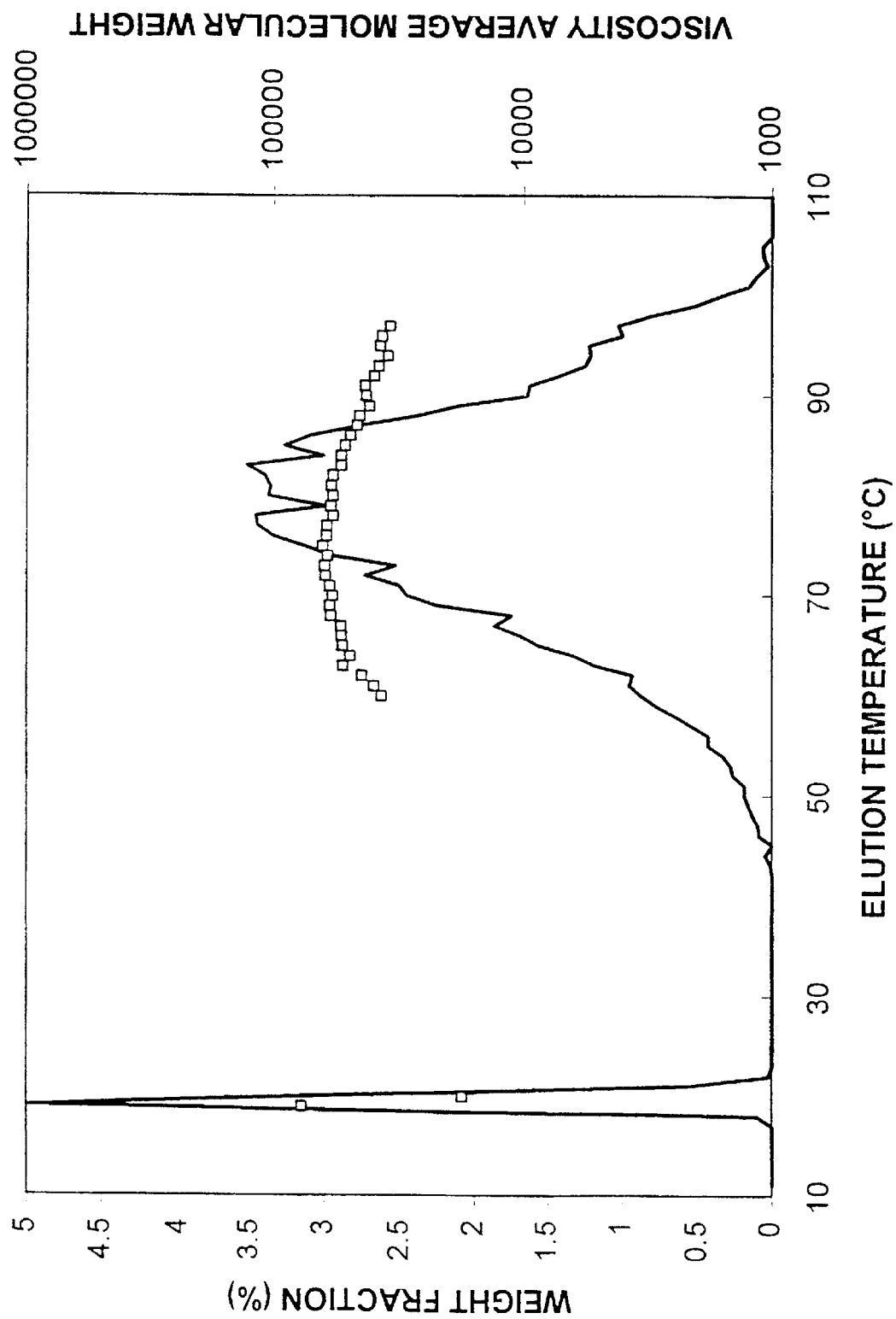
FIG. 10 is an ATREF-DV plot for the composition of Comparative Example C, Novacore, a gas phase produced PE.
Figure 11:
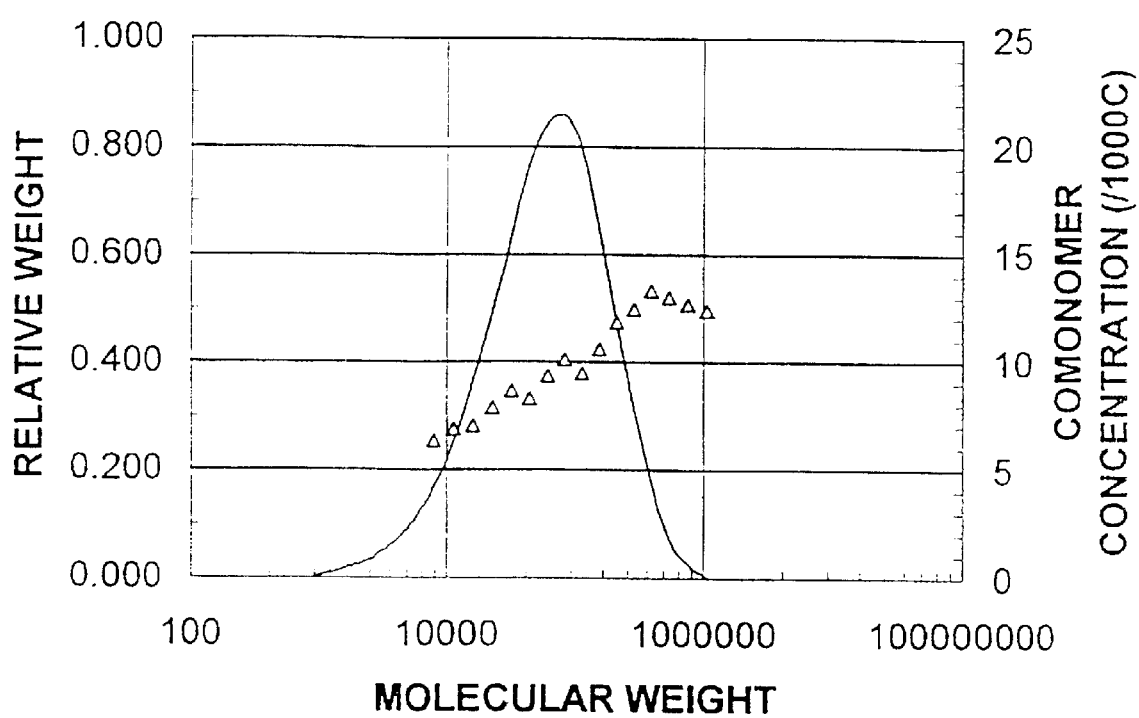
FIG. 11 is a plot of GPC-FTIR data for the composition of Example 1.
Figure 12:
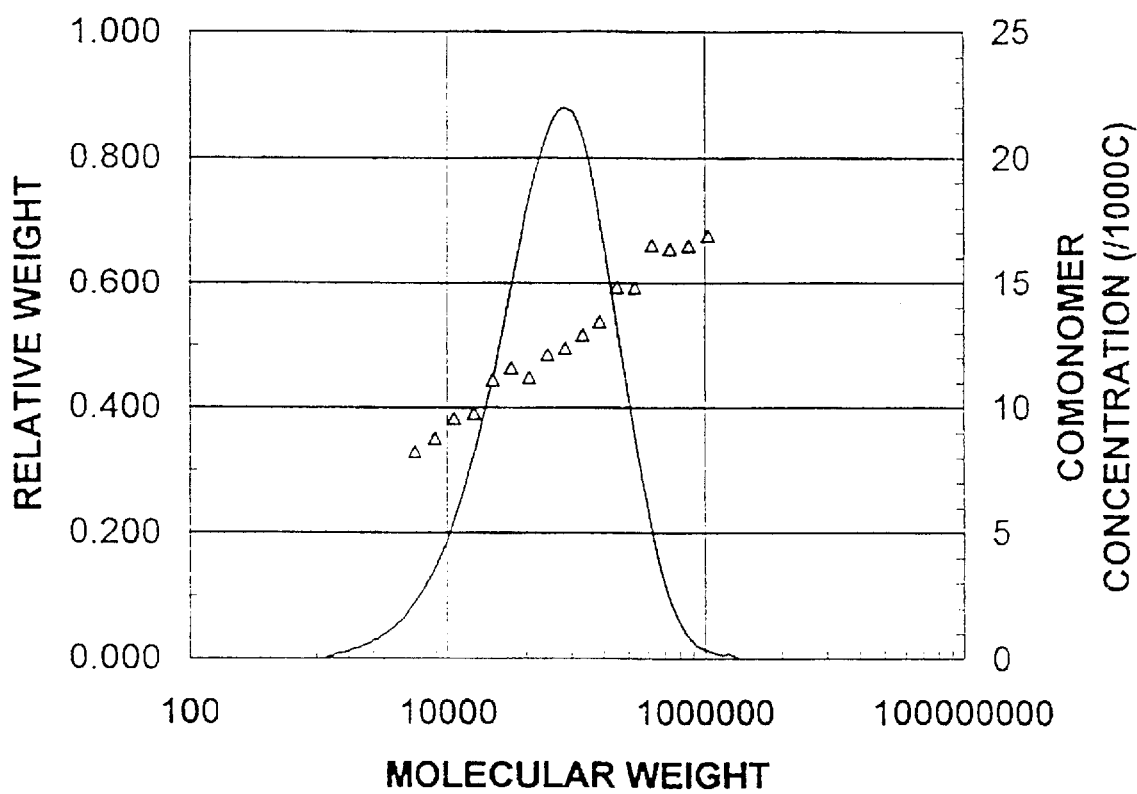
FIG. 12 is a plot of GPC-FTIR data for the composition of Example 2.
Figure 13:
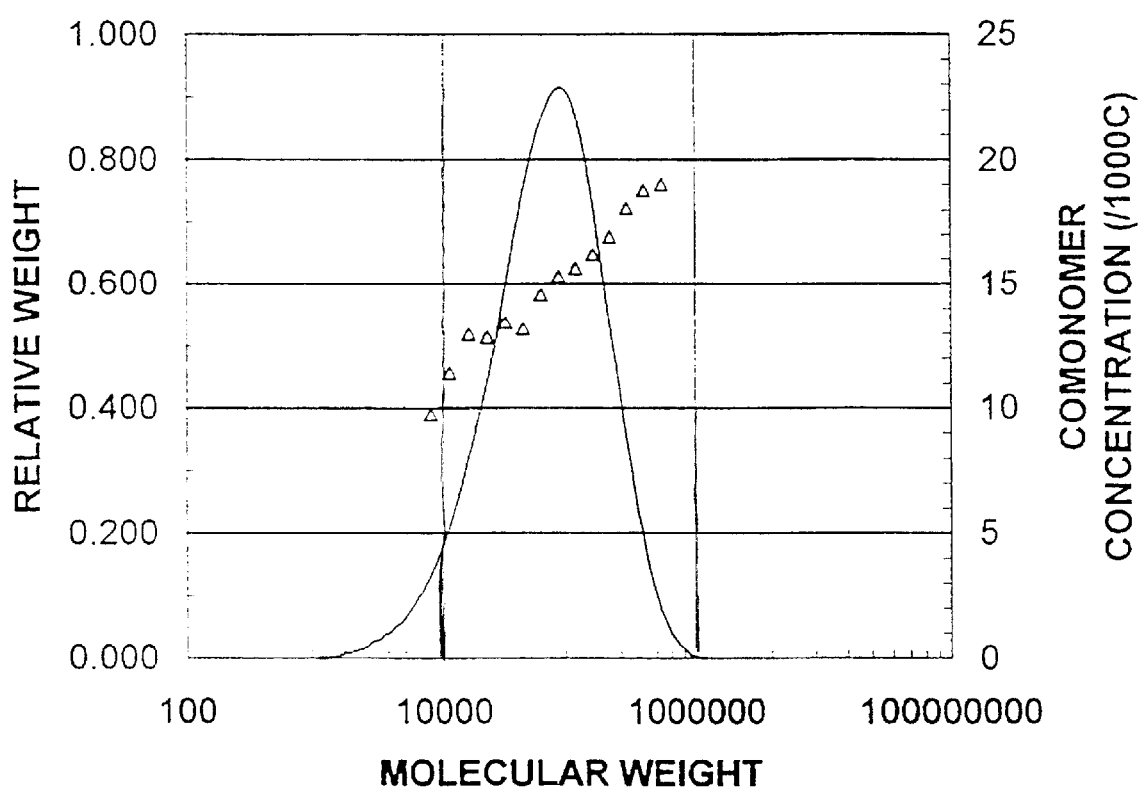
FIG. 13 is a plot of GPC-FTIR data for the composition of Example 3.
Figure 14:
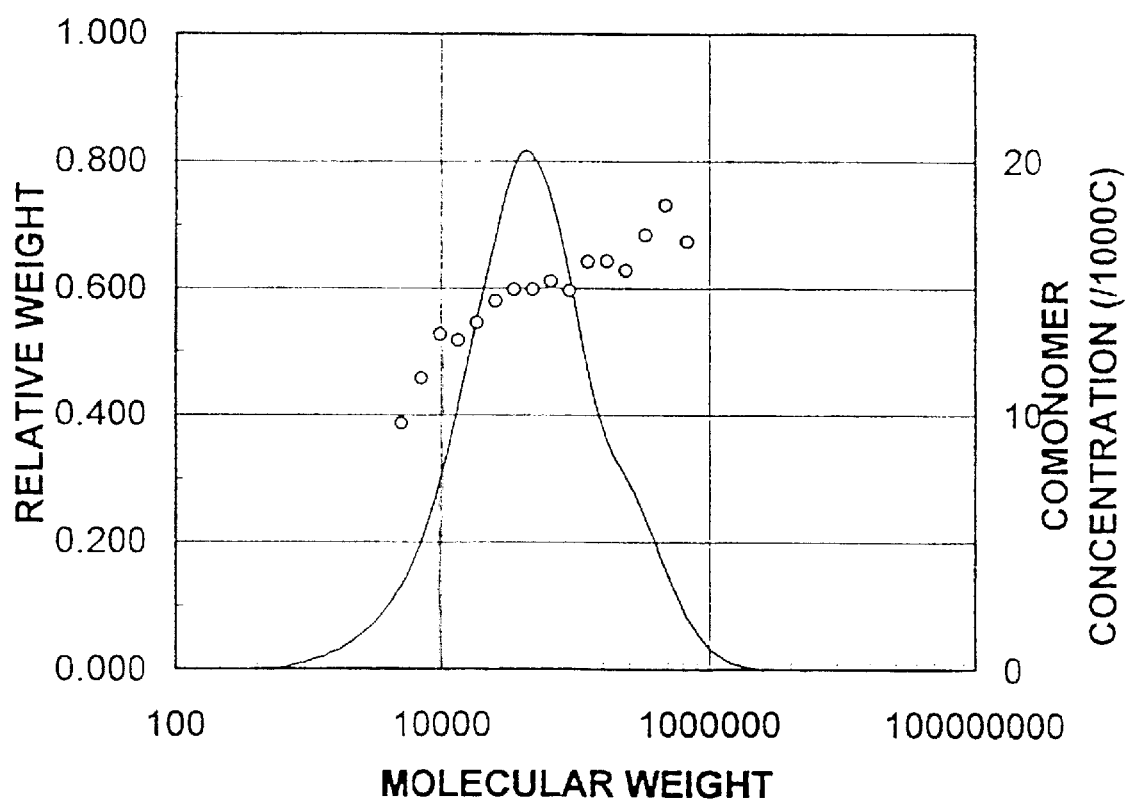
FIG. 14 is a plot of GPC-FTIR data for the composition of Example 5.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Suitable catalysts for use herein may be derivatives of any transition metal including Lanthanides, but preferably of Group 3, 4, or Lanthanide metals which are in the +2, +3, or +4 formal oxidation state. Preferred compounds include metal complexes containing from one to three π-bonded anionic or neutral ligand groups, which may be cyclic or noncyclic delocalized π-bonded anionic ligand groups. Exemplary of such π-bonded anionic ligand groups are conjugated or nonconjugated, cyclic or non-cyclic dienyl groups, allyl groups, and arene groups. By the term "π-bonded" is meant that the ligand group is bonded to the transition metal by means of a π bond.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system, a hydrogenated fused ring system, or a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organo-metalloid radicals include trimethylsilyl, triethylsilyl, ethyldimethylsilyl, methyldiethylsilyl, triphenylgermyl. and trimethylgermyl groups. Examples of Group 15 or 16 hetero atom containing moieties include amine, phosphine, ether or thioether moieties or divalent derivatives thereof, such as, for example, amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

A suitable class of catalysts are transition metal complexes corresponding to the formula:

$$L_lMX_mX'_nX''_p, \text{ or a dimer thereof}$$

wherein:

L is an anionic, delocalized, π-bonded group that is bound to M, containing up to 50 nonhydrogen atoms, optionally two L groups may be joined together forming a bridged structure, and further optionally one L may be bound to X;

M is a metal of Group 4 of the Periodic Table of the Elements in the +2, +3 or +4 formal oxidation state;

X is an optional, divalent substituent of up to 50 nonhydrogen atoms that together with L forms a metallocycle with M;

X' is an optional neutral Lewis base having up to 20 non-hydrogen atoms;

X" each occurrence is a monovalent, anionic moiety having up to 40 nonhydrogen atoms, optionally, two X" groups may be covalently bound together forming a divalent dianionic moiety having both valences bound to M, or, optionally two X" groups may be covalently bound together to form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3; and the sum, l+m+p, is equal to the formal oxidation state of M, except when two X" groups together form a neutral conjugated or nonconjugated diene that is π-bonded to M, in which case the sum l+m is equal to the formal oxidation state of M.

Preferred complexes include those containing either one or two L groups. The latter complexes include those containing a bridging group linking the two L groups. Preferred bridging groups are those corresponding to the formula (ER*$_2$)$_x$ wherein E is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy.

Examples of the complexes containing two L groups are compounds corresponding to the formula:

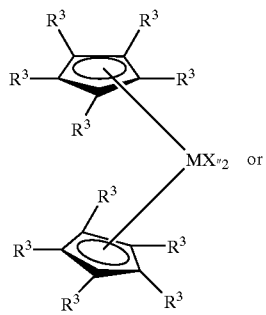

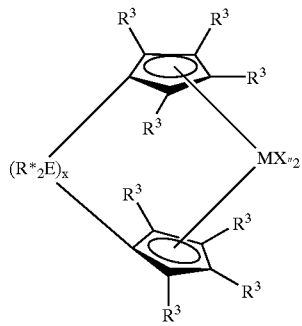

wherein:

M is zirconium, zirconium or hafnium, preferably zirconium or hafnium, in the +2 or +4 formal oxidation state;

R$^3$ in each occurrence independently is selected from the group consisting of hydrogen, hydrocarbyl, silyl, germyl, cyano, halo and combinations thereof, said R$_3$ having up to 20 nonhydrogen atoms, or adjacent R$^3$ groups together form a divalent derivative (that is, a hydrocarbadiyl, siladiyl or germadiyl group) thereby forming a fused ring system; and X" independently each occurrence is an anionic ligand group of up to 40 nonhydrogen atoms, or two X" groups together form a divalent anionic ligand group of up to 40 nonhydrogen atoms or together are a conjugated diene having from 4 to 30 nonhydrogen atoms forming a π-complex with M, whereupon M is in the +2 formal oxidation state; and R*, E and x are as previously defined.

The foregoing metal complexes are especially suited for the preparation of polymers having stereoregular molecular structure. In such capacity it is preferred that the complex possesses C$_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include rac bis-indenyl complexes. Similar systems based on Ti(IV) or Zr(IV) were disclosed for preparation of isotactic olefin polymers in Wild et al., *J. Organomet. Chem.*, 232, 233–47, (1982).

Exemplary bridged ligands containing two π-bonded groups are: (dimethylsilyl-bis(cyclopentadienyl)), (dimethylsilyl-bis(methylcyclopentadienyl)), (dimethylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis (tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilyl-cyclopentadienyl-tetrahydrofluorenyl), (1,1,2,2-tetramethyl-1,2-disilyl-bis-cyclopentadienyl), (1,2-bis(cyclopentadienyl)ethane, and (isopropylidene-cyclopentadienyl-fluorenyl).

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention corresponds to the preceding formula $L_lMX_mX'_nX''_p$, or a dimer thereof, wherein X is a divalent substituent of up to 50 nonhydrogen atoms that together with L forms a metallocycle with M.

Preferred divalent X substituents include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

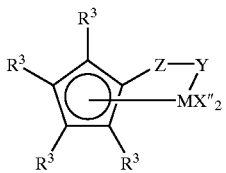

wherein:

M is titanium or zirconium in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 nonhydrogen atoms, or adjacent $R^3$ groups together form a divalent derivative (that is, a hydrocarbadiyl, siladiyl or germadiyl group) thereby forming a fused ring system;

each X" is a halo, hydrocarbyl, hydrocarbyloxy or silyl group, said group having up to 20 nonhydrogen atoms, or two X" groups together form a neutral $C_{5-30}$ conjugated diene or a divalent derivative thereof;

Y is —O—, —S—, —NR*—, —PR*—; and

Z is $SiR*_2$, $CR*_2$, $SiR*_2SiR*_2$, $CR*_2CR*_2$, $CR*=CR*$, $CR*_2SiR*_2$, or $GeR*_2$, wherein R* is as previously defined.

An especially preferred group of transition metal complexes for use in the catalysts of this invention are those disclosed in U.S. Pat. No. 5,470,993, incorporated herein by reference, which correspond to the formula:

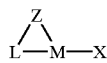

wherein:

M is titanium or zirconium in the +2 formal oxidation state;

L is a group containing a cyclic, delocalized anionic, π-system through which the group is bound to M, and which group is also bound to Z;

Z is a moiety bound to M via σ-bond, comprising boron, and the members of Group 14 of the Periodic Table of the Elements, and also comprising an element selected from the groups consisting of an element selected from the groups consisting of nitrogen, phosphorus, sulfur and oxygen, said moiety having up to 60 nonhydrogen atoms; and X is a neutral, conjugated or nonconjugated diene, optionally substituted with one or more groups selected from hydrocarbyl or trimethylsilyl groups, said X having up to 40 carbon atoms and forming a π-complex with M.

Illustrative Group 4 metal complexes that may be employed in the practice of the present invention include:

cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-dimethylpentadienyl,
cyclopentadienyltitanium-2,4-dimethylpentadienyl.triethylphosphine,
cyclopentadienyltitanium-2,4-dimethylpentadienyl.trimethylphosphine,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl
pentamethylcyclopentadienyltitaniumtribenzyl,
pentamethylcyclopentadienyltitaniumdimethylmethoxide,
pentamethylcyclopentadienyltitaniumdimethylchloride,
bis($\eta^5$-2,4-dimethylpentadienyl)titanium,
bis($\eta^5$-2,4-dimethylpentadienyl)titanium.trimethylphosphine,
bis($\eta^5$-2,4-dimethylpentadienyl)titanium.triethylphosphine,
octahydrofluorenyltitaniumtrimethyl,
tetrahydroindenyltitaniumtrimethyl,
tetrahydrofluorenyltitaniumtrimethyl,
(tert-butylamido)(1,1-dimethyl-2,3,4,9,10-η-1,4,5,6,7,8-hexahydronaphthalenyl) dimethylsilanetitaniumdimethyl,
(tert-butylamido)(1,1,2,3-tetramethyl-2,3,4,9,10-η-1,4,5,6,7,8-hexahydronaphthalenyl) dimethylsilanetitaniumdimethyl,
(tert-butylamido)(tetramethyl-$\eta^5$-cyclopentadienyl) dimethylsilanetitanium dibenzyl, (tert-butylamido)(tetramethyl-η⁵-cyclopentadienyl) dimethylsilanetitanium dimethyl,
(tert-butylamido)(tetramethyl-η⁵-cyclopentadienyl)-1,2-ethanediyltitanium dimethyl,
(tert-butylamido)(tetramethyl-η⁵-indenyl) dimethylsilanetitanium dimethyl,
(tert-butylamido)(tetramethyl-η⁵-cyclopentadienyl) dimethylsilane titanium(III) 2-(dimethylamino)benzyl;
(tert-butylamido)(tetramethyl-η⁵-cyclopentadienyl) dimethylsilanetitanium(III) allyl,
(tert-butylamido)(tetramethyl-η⁵-cyclopentadienyl) dimethylsilanetitanium(III) 2,4-dimethylpentadienyl,
(tert-butylamido)(tetramethyl-η⁵-cyclopentadienyl) dimethylsilanetitanium(II) 1,4-diphenyl-1,3-butadiene,
(tert-butylamido)(tetramethyl-η⁵-cyclopentadienyl) dimethylsilanetitanium(II) 1,3-pentadiene,
(tert-butylamido)(2-methylindenyl) dimethylsilanetitanium(II) 1,4-diphenyl-1,3-butadiene,
(tert-butylamido)(2-methylindenyl) dimethylsilanetitanium(II) 2,4-hexadiene,
(tert-butylamido)(2-methylindenyl) dimethylsilanetitanium(IV) 2,3-dimethyl-1,3-butadiene,
(tert-butylamido)(2-methylindenyl) dimethylsilanetitanium(IV) isoprene,
(tert-butylamido)(2-methylindenyl) dimethylsilanetitanium(IV) 1,3-butadiene,
(tert-butylamido)(2,3-dimethylindenyl) dimethylsilanetitanium(IV) 2,3-dimethyl-1,3-butadiene,
(tert-butylamido)(2,3-dimethylindenyl) dimethylsilanetitanium(IV) isoprene
(tert-butylamido)(2,3-dimethylindenyl) dimethylsilanetitanium(IV) dimethyl
(tert-butylamido)(2,3-dimethylindenyl) dimethylsilanetitanium(IV) dibenzyl
(tert-butylamido)(2,3-dimethylindenyl) dimethylsilanetitanium(IV) 1,3-butadiene,
(tert-butylamido)(2,3-dimethylindenyl) dimethylsilanetitanium(II) 1,3-pentadiene,
(tert-butylamido)(2,3-dimethylindenyl) dimethylsilanetitanium(II) 1,4-diphenyl-1,3-butadiene,
(tert-butylamido)(2-methylindenyl) dimethylsilanetitanium(II) 1,3-pentadiene,
(tert-butylamido)(2-methylindenyl) dimethylsilanetitanium(IV) dimethyl,
(tert-butylamido)(2-methylindenyl) dimethylsilanetitanium(IV) dibenzyl,
(tert-butylamido)(2-methyl-4-phenylindenyl) dimethylsilanetitanium(II) 1,4-diphenyl-1,3-butadiene,
(tert-butylamido)(2-methyl-4-phenylindenyl) dimethylsilanetitanium(II) 1,3-pentadiene,
(tert-butylamido)(2-methyl-4-phenylindenyl) dimethylsilanetitanium(II) 2,4-hexadiene,
(tert-butylamido)(tetramethyl-η⁵-cyclopentadienyl) dimethylsilanetitanium(IV) 1,3-butadiene,
(tert-butylamido)(tetramethyl-η⁵-cyclopentadienyl) dimethylsilanetitanium(IV) 2,3-dimethyl-1,3-butadiene,
(tert-butylamido)(tetramethyl-η⁵-cyclopentadienyl) dimethylsilanetitanium(IV) isoprene,
(tert-butylamido)(tetramethyl-η⁵-cyclopentadienyl) dimethylsilanetitanium(II) 1,4-dibenzyl-1,3-butadiene,
(tert-butylamido)(tetramethyl-η⁵-cyclopentadienyl) dimethylsilanetitanium(II) 2,4-hexadiene,
(tert-butylamido)(tetramethyl-η⁵-cyclopentadienyi) dimethylsilanetitanium(II) 3-methyl-1,3-pentadiene,
(tert-butylamido)(2,4-dimethylpentadien-3-yl) dimethylsilanetitaniumdimethyl,
(tert-butylamido)(6,6-dimethylcyclohexadienyl) dimethylsilanetitaniumdimethyl,
(tert-butylamido)(1,1-dimethyl-2,3,4,9,10-η-1,4,5,6,7,8-hexahydronaphthalen-4-yl) dimethylsilanetitaniumdimethyl,
(tert-butylamido)(1,1,2,3-tetramethyl-2,3,4,9,10-η-1,4,5,6,7,8-hexahydronaphthalen-4-yl) dimethylsilanetitaniumdimethyl,
(tert-butylamido)(tetramethyl-η⁵-cyclopentadienyl) methylphenylsilanetitanium(IV) dimethyl,
(tert-butylamido)(tetramethyl-η⁵-cyclopentadienyl) methylphenylsilanetitanium(II) 1,4-diphenyl-1,3-butadiene,
1-(tert-butylamido)-2-(tetramethyl-η⁵-cyclopentadienyl) ethanediyltitanium(IV) dimethyl, and
1-(tert-butylamido)-2-(tetramethyl-η⁵-cyclopentadienyl) ethanediyltitanium (II) 1,4-diphenyl-1,3-butadiene.

Complexes containing two L groups including bridged complexes suitable for use in the present invention include:
bis(cyclopentadienyl)zirconiumdimethyl,
bis(cyclopentadienyl)zirconiumdibenzyl,
bis(cyclopentadienyl)zirconiummethylbenzyl,
bis(cyclopentadienyl)zirconiummethylphenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconium methyltrimethylsilyl,
bis(tetrahydroindenyl)zirconium methyltrimethylsilyl,
bis(pentamethylcyclopentadienyl) zirconiummethylbenzyl,
bis(pentamethylcyclopentadienyl)zirconiumdibenzyl,
bis(pentamethylcyclopentadienyl) zirconiummethylmethoxide,
bis(pentamethylcyclopentadienyl) zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl) zirconiumdimethyl,
bis(methylpropylcyclopentadienyl)zirconiumdibenzyl,
bis(trimethylsilylcyclopentadienyl)zirconiumdibenzyl,
dimethylsilyl-bis(cyclopentadienyl)zirconiumdimethyl,
dimethylsilyl-bis(tetramethylcyclopentadienyl)titanium-(III) allyl
dimethylsilyl-bis(t-butylcyclopentadienyl) zirconiumdichloride,
dimethylsilyl-bis(n-butylcyclopentadienyl) zirconiumdichloride, methylene-bis(tetramethylcyclopentadienyl)titanium(III) 2-(dimethylamino)benzyl, methylene-bis(n-butylcyclopentadienyl)titanium(III)2-(dimethylamino)benzyl, dimethylsilyl-bis(indenyl)zirconiumbenzylchloride, dimethylsilyl-bis(2-methylindenyl)zirconiumdimethyl, dimethylsilyl-bis(2-methyl-4-phenylindenyl)zirconiumdimethyl, dimethylsilyl-bis(2-methylindenyl)zirconium-1,4-diphenyl-1,3-butadiene, dimethylsilyl-bis(2-methyl-4-phenylindenyl)zirconium (II) 1,4-diphenyl-1,3-butadiene, dimethylsilyl-bis(tetrahydroindenyl)zirconium(II) 1,4-diphenyl-1,3-butadiene, dimethylsilyl-bis(fluorenyl)zirconiummethylchloride, dimethylsilyl-bis(tetrahydrofluorenyl)zirconium bis(trimethylsilyl), (isopropylidene)(cyclopentadienyl)(fluorenyl)zirconiumdibenzyl, and dimethylsilyl(tetramethylcyclopentadienyl)(fluorenyl)zirconiumdimethyl.

An especially preferred bis-CP complex for use in the catalysts useful in this invention are the bridged bis-Cp complexes of EP 676,421 which correspond to the formula:

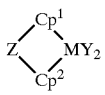

wherein
  $Cp^1$, $Cp^2$ are independently a substituted or unsubstituted indenyl or hydrogenated indenyl group;
  Y is a univalent anionic ligand, or $Y_2$ is a diene;
  M is zirconium, titanium or hafnium; and
  Z is a bridging group comprising an alkylene group having 1 to 20 carbon atoms or a dialkyl silyl- or germyl-group, or alkyl phosphine or amine radical.

Other catalysts, especially catalysts containing other Group 4 metals, will, of course, be apparent to those skilled in the art. A wide variety of organometallic compounds, including nonmetallocenes, which are useful in this invention are also apparent to those skilled in the art.

The complexes are rendered catalytically active by combination with an activating cocatalyst or by use of an activating technique. Suitable activating cocatalysts for use herein include polymeric or oligomeric alumoxanes, especially methylalumoxane, triisobutyl aluminum-modified methylalumoxane, or diisobutylalumoxane; strong Lewis acids, such as $C_{1-30}$ hydrocarbyl substituted Group 13 compounds, especially tri(hydrocarbyl)aluminum- or tri(hydrocarbyl)boron-compounds and halogenated derivatives thereof, having from 1 to 10 carbons in each hydrocarbyl or halogenated hydrocarbyl group, especially tris(pentafluorophenyl)borane; and nonpolymeric, inert, compatible, noncoordinating, ion forming compounds (including the use of such compounds under oxidizing conditions). A suitable activating technique is bulk electrolysis (explained in more detail hereinafter). Combinations of the foregoing activating cocatalysts and techniques may also be employed if desired. The foregoing activating cocatalysts and activating techniques have been previously taught with respect to different metal complexes in the following references: EP-A-277,003; U.S. Pat. No. 5,153,157; U.S. Pat. No. 5,064,802; EP-A-468,651 (equivalent to U.S. Ser. No. 07/547,718); EP-A-520,732 (equivalent to U.S. Ser. No. 07/876,268); and WO 93/23412 (equivalent to U.S. Ser. No. 07/884,966 filed May 1, 1992); the teachings of which are hereby incorporated by reference.

Suitable nonpolymeric, inert, compatible, noncoordinating, ion forming compounds useful as cocatalysts in one embodiment of the present invention comprise a cation which is a Bronsted acid capable of donating a proton, and a compatible, noncoordinating, anion, $A^-$.

Preferred anions are those containing a single coordination complex comprising a charge-bearing metal or metalloid core which anion is capable of balancing the charge of the active catalyst species (the metal cation) which is formed when the two components are combined. Also, said anion can be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are well known and many, particularly such compounds containing a single boron atom in the anion portion, are available commercially.

Preferably such cocatalysts may be represented by the following general formula:

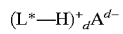

wherein:
  $L^*$ is a neutral Lewis base;
  $(L^*—H)^+$ is a Bronsted acid;
  $A^{d-}$ is a noncoordinating, compatible anion having a charge of d–; and
  d is an integer from 1 to 3.
  More preferably d is one, that is, $A^{d-}$ is $A^-$.
  Highly preferably, A corresponds to the formula:

wherein:
  B is boron in the +3 formal oxidation state; and
  Q independently each occurrence is selected from hydride, dialkylamido, halide, alkoxide, aryloxide, hydrocarbyl, halocarbyl, and halosubstituted-hydrocarbyl radicals, said Q having up to 20 carbons with the proviso that in not more than one occurrence is Q halide.

In a more highly preferred embodiment, Q is a fluorinated $C_{1-20}$ hydrocarbyl group, most preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl(2,4,6-trimethylanilinium) tetraphenylborate, trimethylammonium tetrakis-(pentafluorophenyl)borate, triethylammonium tetrakis-(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis (pentafluoro-phenyl)borate, N,N-dimethyl(2,4,6-trimethyl-anilinium)tetrakis-(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4.6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, and N,N-dimethyl-(2,4,6-trimethylanilinium) tetrakis-(2,3,4,6-tetrafluorophenyl)borate.

Dialkyl ammonium salts such as: di-(i-propyl)ammonium tetrakis(pentafluorophenyl)borate, and dicyclohexylammonium tetrakis(pentafluorophenyl)borate.

Tri-substituted phosphonium salts such as: triphenylphosphonium tetrakis(pentafluorophenyl)borate, tri(o-tolyl)phosphonium tetrakis(penta-fluorophenyl)borate, and tri(2,6-dimethylphenyl)-phosphonium tetrakis(penta-fluorophenyl)borate.

Preferred are N,N-dimethylanilinium tetrakis(pentafluorophenyl)borate and tributylammonium tetrakis(pentafluorophenyl)borate.

Another suitable ion forming, activating cocatalyst comprises a salt of a cationic oxidizing agent and a noncoordinating, compatible anion represented by the formula:

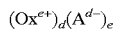

wherein:

$Ox^{e+}$ is a cationic oxidizing agent having charge e+;

e is an integer from 1 to 3; and $A^{d-}$, and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion or silylium ion and a noncoordinating, compatible anion represented by the formula:

wherein:

Ⓒ$^+$ is a $C_{1-20}$ carbenium ion or silylium ion; and $A^-$ is as previously defined.

A preferred carbenium ion is the trityl cation, that is triphenylcarbenium. A preferred silylium ion is triphenylsilylium.

The foregoing activating technique and ion forming cocatalysts are also preferably used in combination with a tri(hydrocarbyl)aluminum compound having from 1 to 4 carbons in each hydrocarbyl group, an oligomeric or polymeric alumoxane compound, or a mixture of a tri(hydrocarbyl)aluminum compound having from 1 to 4 carbons in each hydrocarbyl group and a polymeric or oligomeric alumoxane.

An especially preferred activating cocatalyst comprises the combination of a trialkyl aluminum compound having from 1 to 4 carbons in each alkyl group and an ammonium salt of tetrakis(pentafluorophenyl)borate, in a molar ratio from 0.1:1 to 1:0.1, optionally up to 1000 mole percent of an alkylalumoxane with respect to M, is also present.

The activating technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0° C. to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), DME, and mixtures thereof.

The electrolysis may be conducted in a standard electrolytic cell containing an anode and cathode (also referred to as the working electrode and counter electrode respectively). Suitable materials of construction for the cell are glass, plastic, ceramic and glass coated metal. The electrodes are prepared from inert conductive materials, by which are meant conductive materials that are unaffected by the reaction mixture or reaction conditions. Platinum or palladium are preferred inert conductive materials. Normally, an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex.

The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and an inert, compatible, noncoordinating anion, $A^-$. Preferred supporting electrolytes are salts corresponding to the formula:

wherein:

$G^+$ is a cation which is nonreactive towards the starting and resulting complex; and $A^-$ is a noncoordinating, compatible anion.

Examples of cations, $G^+$, include tetrahydrocarbyl substituted ammonium or phosphonium cations having up to 40 nonhydrogen atoms. A preferred cation is the tetra-n-butylammonium cation.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode.

Preferred supporting electrolytes are tetrahydrocarbylammonium salts of tetrakis(perfluoroaryl)borates having from 1 to 10 carbons in each hydrocarbyl group, especially tetra-n-butylammonium tetrakis(pentafluorophenyl)borate.

The molar ratio of catalyst/cocatalyst employed preferably ranges from 1:10,000 to 100:1, more preferably from 1:5000 to 10:1, most preferably from 1:10 to 10:1.

In general, the catalysts can be prepared by combining the two components (metal complex and activator) in a suitable solvent at a temperature within the range from about −100° C. to about 300° C. The catalyst may be separately prepared prior to use by combining the respective components or prepared in situ by combination in the presence of the monomers to be polymerized.

It is understood with suitable functionality on the catalyst or cocatalyst the catalyst system can be covalently or ionically attached to the support material.

Preferred supports for use in the present invention include highly porous silicas, aluminas, aluminosilicates, and mixtures thereof. The most preferred support material is silica. The support material may be in granular, agglomerated, pelletized, or any other physical form. Suitable materials include, but are not limited to, silicas available from Grace Davison (division of W.R. Grace & Co.) under the designations SD 3216.30, Davison Syloid 245, Davison 948 and Davison 952, and from Crossfield under the designation ES70, and from Degussa AG under the designation Aerosil 812; and aluminas available from Akzo Chemicals Inc. under the designation Ketzen Grade B.

Supports suitable for the present invention preferably have a surface area as determined by nitrogen porosimetry using the B.E.T. method from 10 to about 1000 m$^2$/g, and preferably from about 100 to 600 m$^2$/g. The pore volume of the support, as determined by nitrogen adsorption, advantageously is between 0.1 and 3 cm$^3$/g, preferably from about 0.2 to 2 cm$^3$/g. The average particle size depends upon the process employed, but typically is from 0.5 to 500 μm, preferably from 1 to 100 μm.

Both silica and alumina are known to inherently possess small quantities of hydroxyl functionality. When used as a support herein, these materials are preferably subjected to a heat treatment and/or chemical treatment to reduce the hydroxyl content thereof. Typical heat treatments are carried out at a temperature from 30° C. to 1000° C. (preferably 250° C. to 800° C. for 5 hours or greater) for a duration of 10 minutes to 50 hours in an inert atmosphere or under reduced pressure. Typical chemical treatments include contacting with Lewis acid alkylating agents such as trihydrocarbyl aluminum compounds, trihydrocarbylchlorosilane compounds, trihydrocarbylalkoxysilane compounds or similar agents. Residual hydroxyl groups are then removed via chemical treatment.

The support may be functionalized with a silane or chlorosilane functionalizing agent to attach thereto pendant silane -(Si—R)=, or chlorosilane —(Si—Cl)=functionality, wherein R is a $C_{1-10}$ hydrocarbyl group. Suitable functionalizing agents are compounds that react with surface hydroxyl groups of the support or react with the silicon or aluminum of the matrix. Examples of suitable functionalizing agents include phenylsilane, hexamethyldisilazane, diphenylsilane, methylphenylsilane, dimethylsilane, diethylsilane, dichlorosilane, and dichlorodimethylsilane. Techniques for forming such functionalized silica or alumina compounds were previously disclosed in U.S. Pat. Nos. 3,687,920 and 3,879,368, the teachings of which are herein incorporated by reference.

The support may also be treated with an aluminum component selected from an alumoxane or an aluminum compound of the formula $AlR^1_{x'}R^2_{y'}$, wherein $R_1$ independently each occurrence is hydride or R, $R^2$ is hydride, R or OR, x' is 2 or 3, y' is 0 or 1 and the sum of x' and y' is 3. Examples of suitable $R^1$ and $R^2$ groups include methyl, methoxy, ethyl, ethoxy, propyl (all isomers), propoxy (all isomers), butyl (all isomers), butoxy (all isomers), phenyl, phenoxy, benzyl, and benzyloxy. Preferably, the aluminum component is selected from the group consisting of aluminoxanes and tri($C_{1-4}$ hydrocarbyl)aluminum compounds. Most preferred aluminum components are aluminoxanes, trimethylaluminum, triethyl luminum, tri-isobutyl luminum, and mixtures thereof.

Alumoxanes (also referred to as aluminoxanes) are oligomeric or polymeric aluminum oxy compounds containing chains of alternating aluminum and oxygen atoms, whereby the aluminum carries a substituent, preferably an alkyl group. The structure of alumoxane is believed to be represented by the following general formulae (—Al(R)—O)$_{m'}$, for a cyclic alumoxane, and $R^2Al$—O(—Al(R)—O)$_{m'}$—$AlR^2$, for a linear compound, wherein R is as previously defined, and m' is an integer ranging from 1 to about 50, preferably at least about 4. Alumoxanes are typically the reaction products of water and an aluminum alkyl, which in addition to an alkyl group may contain halide or alkoxide groups. Reacting several different aluminum alkyl compounds, such as for example trimethyl aluminum and tri-isobutyl aluminum, with water yields so-called modified or mixed alumoxanes. Preferred alumoxanes are methylalumoxane and methylalumoxane modified with minor amounts of $C_{2-4}$ alkyl groups, especially isobutyl. Alumoxanes generally contain minor to substantial amounts of starting aluminum alkyl compound.

Particular techniques for the preparation of alumoxane type compounds by contacting an aluminum alkyl compound with an inorganic salt containing water of crystallization are disclosed in U.S. Pat. No. 4,542,119. in a particular preferred embodiment an aluminum alkyl compound is contacted with a regeneratable water-containing substance such as hydrated alumina, silica or other substance. This is disclosed in EP-A-338,044. Thus the alumoxane may be incorporated into the support by reaction of a hydrated alumina or silica material, which has optionally been functionalized with silane, siloxane, hydrocarbyloxysilane, or chlorosilane groups, with a tri ($C_{1-10}$ alkyl) aluminum compound according to known techniques. For the teachings contained therein the foregoing patents and publications, or there corresponding equivalent United States applications, are hereby incorporated by reference.

The treatment of the support material in order to also include optional alumoxane or trialkylaluminum loadings involves contacting the same before, after or simultaneously with addition of the complex or activated catalyst hereunder with the alumoxane or trialkylaluminum compound, especially triethylaluminum or triisobutylaluminum. Optionally the mixture can also be heated under an inert atmosphere for a period and at a temperature sufficient to fix the alumoxane, trialkylaluminum compound, complex or catalyst system to the support. Optionally, the treated support component containing alumoxane or the trialkylaluminum compound may be subjected to one or more wash steps to remove alumoxane or trialkylaluminum not fixed to the support.

Besides contacting the support with alumoxane the alumoxane may be generated in situ by contacting an unhydrolyzed silica or alumina or a moistened silica or alumina with a trialkyl aluminum compound optionally in the presence of an inert diluent. Such a process is well known in the art, having been disclosed in EP-A-250,600; U.S. Pat. No.

4,912,075; and U.S. Pat. No. 5,008,228; the teachings of which, or of the corresponding U.S. application, are hereby incorporated by reference. Suitable aliphatic hydrocarbon diluents include pentane, isopentane, hexane, heptane, octane, isooctane, nonane, isononane, decane, cyclohexane, methylcyclohexane and combinations of two or more of such diluents. Suitable aromatic hydrocarbon diluents are benzene, toluene, xylene, and other alkyl or halogen substituted aromatic compounds. Most preferably, the diluent is an aromatic hydrocarbon, especially toluene. After preparation in the foregoing manner the residual hydroxyl content thereof is desirably reduced to a level less than 1.0 meq of OH per gram of support by any of the previously disclosed techniques.

The cocatalysts of the invention may also be used in combination with a tri(hydrocarbyl)aluminum compound having from 1 to 10 carbons in each hydrocarbyl group, an oligomeric or polymeric alumoxane compound, a di(hydrocarbyl)(hydrocarbyloxy)aluminum compound having from 1 to 10 carbons in each hydrocarbyl or hydrocarbyloxy group, or a mixture of the foregoing compounds, if desired. These aluminum compounds are usefully employed for their beneficial ability to scavenge impurities such as oxygen, water, and aldehydes from the polymerization mixture. Preferred aluminum compounds include $C_{2-6}$ trialkyl aluminum compounds, especially those wherein the alkyl groups are ethyl, propyl, isopropyl, n-butyl, isobutyl, pentyl, neopentyl, or isopentyl, and methylalumoxane, modified methylalumoxane and diisobutylalumoxane. The molar ratio of aluminum compound to metal complex is preferably from 1:10,000 to 1000:1, more preferably from 1:5000 to 100:1, most preferably from 1:100 to 100:1.

The molar ratio of catalyst/cocatalyst employed ranges from 1:1000 to 1:10, preferably ranges from 1:10 to 10:1, more preferably from 1:5 to 1:1, most preferably from 1:1.2 to 1:1. Mixtures of the activating cocatalysts of the present invention may also be employed if desired. In most polymerization reactions the molar ratio of catalyst:polymerizable compounds employed is from $10^{-12}:1$ to $10^{-1}:1$, more preferably from $10^{-12}:1$ to $10^{-5}:1$.

Molecular weight control agents can be used in combination with the present cocatalysts. Examples of such molecular weight control agents include hydrogen, trialkyl aluminum compounds or other known chain transfer agents. It is understood that the present invention is operable in the absence of any component which has not been specifically disclosed. The following examples are provided in order to further illustrate the invention and are not to be construed as limiting. Unless stated to the contrary, all parts and percentages are expressed on a weight basis.

The catalysts, whether or not supported, in any of the processes of this invention, whether gas phase, solution, slurry, or any other polymerization process, may be used to polymerize addition polymerizable monomers include ethylenically unsaturated monomers, acetylenic compounds, conjugated or nonconjugated dienes, polyenes, and mixtures thereof. Preferred monomers include olefins, for examples α-olefins having from 2 to 100,000, preferably from 2 to 30, more preferably from 2 to 8 carbon atoms and combinations of two or more of such α-olefins.

Particularly suitable c-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene, and $C_{16}$–$C_{30}$ α-olefins or combinations thereof, as well as long chain vinyl terminated oligomeric or polymeric reaction products formed during the polymerization. Preferably, the α-olefins are ethylene, propene, 1-butene, 4-methyl-pentene-1,1-hexene, 1-octene, and combinations of ethylene and/or propene with one or more of such other α-olefins. Other preferred monomers include styrene, halo- or alkyl substituted styrenes, tetrafluoroethylene, vinylcyclobutene, 1,4-hexadiene. dicyclopentadiene, ethylidene norbornene, and 1,7-octadiene. Mixtures of the above-mentioned monomers may also be employed.

A preferred group of olefin comonomers for polymerizations where ethylene is the monomer includes propene, 1-butene, 1-pentene, 4-methyl-1-pentene, 1-hexene, 1-heptene, 1-octene, 1-nonene, 1-decene, 1,7-octadiene, 1,5-hexadiene, 1,4-pentadiene, 1,9-decadiene, ethylidenenorbornene, styrene, or a mixture thereof. For polymerizations wherein propene is the monomer, the preferred comonomers are the same as that immediately previous, but with the inclusion of ethylene instead of propene.

Long chain macromolecular α-olefins can be vinyl terminated polymeric remnants formed in situ during continuous solution polymerization reactions. Under suitable processing conditions such long chain macromolecular units may be polymerized into the polymer product along with ethylene and other short chain olefin monomers to give small quantities of long chain branching in the resulting polymer.

In general, the polymerization may be accomplished at conditions well known in the prior art for Ziegler-Natta or Kaminsky-Sinn type polymerization reactions. Suspension, solution, slurry, gas phase or high pressure, whether employed in batch or continuous form or other process conditions, may be employed if desired. Examples of such well known polymerization processes are depicted in WO 88/02009, U.S. Pat. Nos. 5,084,534; 5,405,922; 4,588,790; 5,032,652; 4,543,399; 4,564,647; 4,522,987, which are incorporated herein by reference; and elsewhere. Preferred polymerization temperatures are from 0–250° C. Preferred polymerization pressures are from atmospheric to 3000 atmospheres.

Preferably, the processes of this invention are performed in a single reactor, which may have a single reaction vessel or two or more vessels producing essentially the same polyolefin copolymer composition. Thus, the polymerization processes of this invention do not produce blends, or where more than one reaction vessel is used do not require blending to produce essentially homogeneous polyolefin copolymer compositions.

In most polymerization reactions the molar ratio of catalyst:polymerizable compounds employed is from $10^{-12}:1$ to $10^{-1}:1$, more preferably from $10^{-12}:1$ to $10^{-5}:1$.

Suitable solvents for polymerization via a solution process are noncoordinating, inert liquids. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{410}$ alkanes, and aromatic and alkyl-substituted aromatic compounds such as benzene, toluene, and xylene. Suitable solvents also include liquid olefins which may act as monomers or comonomers including ethylene, propylene, 1-butene, butadiene, cyclopentene, 1-hexene, 1-heptene 3-methyl-1-pentene, 4-methyl-1-pentene, 1,4-hexadiene, 1,7-octadiene, 1,9-decadiene, 1-octene, 1-decene, styrene, divinylbenzene, ethylidenenorbornene, allylbenzene, vinyltoluene (including all isomers alone or in admixture), 4-vinylcyclohexene, and vinylcyclohexane. Mixtures of the foregoing are also suitable.

One such polymerization process comprises: contacting, optionally in a solvent, one or more α-olefins with a catalyst in one or more continuous stirred tank or tubular reactors. U.S. Pat. No.'s 5,272,236 and 5,278,272 related to olefin polymerizations in solution and are incorporated herein by reference.

The process of the present invention can be employed to advantage in the gas phase copolymerization of olefins. Gas phase processes for the polymerization of olefins, especially the homopolymerization and copolymerization of ethylene and propylene, and the copolymerization of ethylene with higher α-olefins such as, for example, 1-butene, 1-hexene, 4-methyl-1-pentene are well known in the art. Such processes are used commercially on a large scale for the manufacture of high density polyethylene (HDPE), medium density polyethylene (MDPE), linear low density polyethylene (LLDPE) and polypropylene.

The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported above a perforated plate, the fluidisation grid, by a flow of fluidisation gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and a one or more heat exchangers to strip the gas of the heat of polymerization.

A preferred method of cooling of the bed, in addition to the cooling provided by the cooled the recycle gas, is to feed a volatile liquid to the bed to provide an evaporative cooling effect. The volatile liquid employed in this case can be, for example, a volatile inert liquid, for example, a saturated hydrocarbon having about 3 to about 8, preferably 4 to 6, carbon atoms. In the case that the monomer or comonomer itself is a volatile liquid, or can be condensed to provide such a liquid, this can be suitably be fed to the bed to provide an evaporative cooling effect. Examples of olefin monomers which can be employed in this manner are olefins containing about three to about eight, preferably three to six carbon atoms. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP 89691; U.S. Pat. No. 4,543,399; WO 94/25495 and U.S. Pat. No. 5,352,749, which are hereby incorporated by reference. A particularly preferred method of recycling the liquid to the bed is to separate the liquid from the recycle gas stream and to reinject this liquid directly into the bed, preferably using a method which generates fine droplets of the liquid within the bed. This type of process is described in BP Chemicals' WO 94/28032, which is hereby incorporated by reference.

The polymerization reaction occurring in the gas fluidized bed is catalyzed by the continuous or semi-continuous addition of catalyst. Such catalyst can be supported on an inorganic or organic support material as described above. The catalyst can also be subjected to a prepolymerization step, for example, by polymerizing a small quantity of olefin monomer in a liquid inert diluent, to provide a catalyst composite comprising catalyst particles embedded in olefin polymer particles.

The polymer is produced directly in the fluidized bed by catalyzed copolymerization of the monomer and one or more comonomers on the fluidized particles of catalyst, supported catalyst or prepolymer within the bed. Start-up of the polymerization reaction is achieved using a bed of preformed polymer particles, which are preferably similar to the target polyolefin, and conditioning the bed by drying with inert gas or nitrogen prior to introducing the catalyst, the monomers and any other gases which it is desired to have in the recycle gas stream, such as a diluent gas, hydrogen chain transfer agent, or an inert condensable gas when operating in gas phase condensing mode. The produced polymer is discharged continuously or discontinuously from the fluidized bed as desired.

The gas phase processes suitable for the practice of this invention are preferably continuous processes which provide for the continuous supply of reactants to the reaction zone of the reactor and the removal of products from the reaction zone of the reactor, thereby providing a steady-state environment on the macro scale in the reaction zone of the reactor.

Typically, the fluidized bed of the gas phase process is operated at temperatures greater than 50° C., preferably from about 60° C. to about 110° C., more preferably from about 70° C. to about 110° C.

Typically the molar ratio of comonomer to monomer used in the polymerization depends upon the desired density for the composition being produced and is about 0.5 or less. Desirably, when producing materials with a density range of from about 0.91 to about 0.93 the comonomer to monomer ratio is less than 0.2, preferably less than 0.05, even more preferably less than 0.02, and may even be less than 0.01. Typically, the ratio of hydrogen to monomer is less than about 0.5, preferably less than 0.2, more preferably less than 0.05, even more preferably less than 0.02 and may even be less than 0.01.

The above-described ranges of process variables are appropriate for the gas phase process of this invention and may be suitable for other processes adaptable to the practice of this invention.

A number of patents and patent applications describe gas phase processes which are adaptable for use in the process of this invention, particularly, U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; and EP applications 659,773; 692,500; and PCT Applications WO 94/29032, WO 94/25497, WO 94/25495, WO 94/28032; WO 95/13305; WO 94/26793; and WO 95/07942 all of which are hereby incorporated herein by reference.

Desirably, the polyolefin copolymer composition of this invention contains in polymerized form from 0.01 to 99.99 mole percent ethylene as the monomer and from 99.99 to 0.01 mole percent of one or more olefin comonomers. More desirably, the composition contains in polymerized form from 0.1 to 99.9 mole percent ethylene as the monomer and from 99.9 to 0.1 mole percent of one or more olefin comonomers. Preferably, the composition contains in polymerized form from 50 to 99.9 mole percent ethylene as the monomer and from 50 to 0.1 mole percent of one or more olefin comonomers. A highly preferred embodiment is that where the composition contains in polymerized form from 96 to 99.9 mole percent ethylene as the monomer and from 4 to 0.1 mole percent of one or more olefin comonomers.

Generally, it is desirable that the density of the composition be from about 0.87 to about 0.96, although it may be higher or lower than this range. More highly desirably, the density is from about 0.90 to about 0.94, and preferably from 0.910 to about 0.925. The composition desirably has a melt index 12 of from about 0.01 to about 150, and an $I_{21}/I_2$ which is equal to or greater than 24, and a Mw/Mn of from about 2.0 to about 10.

A preferred polyolefin copolymer composition is that wherein the composition has an $I_{21}/I_2$ which is equal to or greater than 24 and a Mw/Mn of from about 2.0 to about 3.5.

A preferred polyolefin copolymer composition is that wherein the composition has a short chain branching distribution that is multimodal, or wherein the composition has a molecular weight distribution that is multimodal.

Another preferred polyolefin copolymer composition of is that wherein the density of the composition is from about 0.910 to about 0.925, the comonomer to monomer molar ratio is less than 0.02, the hydrogen to monomer ratio is less than 0.02, and the composition is produced in a reactor with a reaction zone having a temperature of 70° C. or higher.

The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The SCBDI of a polymer is readily calculated from data obtained from techniques known in the art, such as, for example, temperature rising elution fractionation (abbreviated herein as "TREF") as described, for example. in Wild et al, *Journal of Polymer Science*, Poly. Phys. Ed., Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the homogeneous linear and for the substantially linear ethylene/α-olefin polymers used in the present invention is preferably greater than 50 percent.

For the polyolefin polymer compositions of this invention, the long chain branch is longer than the short chain branch that results from the incorporation of one or more α-olefin comonomers into the polymer backbone. The empirical effect of the presence of long chain branching in the copolymers of this invention is manifested as enhanced Theological properties which are indicated by higher flow activation energies, and greater $I_{21}/I_2$ than expected from the other structural properties of the compositions.

Measurement of Comonomer Content vs Log Molecular Weight by GPC/FTIR

The comonomer content as a function of molecular weight was measured by coupling a Fourier transform infrared spectrometer (FTIR) to a Waters 150° C. Gel Permeation Chromatograph (GPC). The setting up, calibration and operation of this system together with the method for data treatment has been described previously (L. J. Rose et al, "Characterisation of Polyethylene Copolymers by Coupled GPC/FTIR" in "Characterisation of Copolymers", Rapra Technology, Shawbury UK, 1995, ISBN 1-85957-048-86.) In order to characterize the degree to which the comonomer is concentrated in the high molecular weight part of the polymer, the GPC/FTIR was used to calculate a parameter named comonomer partition factor, $C_{pf}$. $M_n$ and $M_w$ were also determined using standard techniques from the GPC data.

Comonomer Partitioning Factor (GPC-FTIR)

The comonomer partitioning factor $C_{pf}$ is calculated from GPC/FTIR data. It characterizes the ratio of the average comonomer content of the higher molecular weight fractions to the average comonomer content of the lower molecular weight fractions. Higher and lower molecular weight are defined as being above or below the median molecular weight respectively, that is, the molecular weight distribution is divided into two parts of equal weight. $C_{pf}$ is calculated from the following equation:

$$C_{pf} = \frac{\dfrac{\sum_{i=1}^{n} w_i \cdot c_i}{\sum_{i=1}^{n} w_i}}{\dfrac{\sum_{j=1}^{m} w_j \cdot c_j}{\sum_{j=1}^{m} w_j}},$$

where: $C_i$ is the mole fraction comonomer content and $w_i$ is the normalized weight fraction as determined by GPC/FTIR for the n FTIR data points above the median molecular weight. $c_j$ is the mole fraction comonomer content and $w_j$ is the normalized weight fraction as determined by GPC/FTIR for the m FTIR data points below the median molecular weight. Only those weight fractions, $w_i$ or $w_j$ which have associated mole fraction comonomer content values are used to calculate $C_{pf}$. For a valid calculation, it is required that n and m are greater than or equal to 3. FTIR data corresponding to molecular weight fractions below 5,000 are not included in the calculation due to the uncertainties present in such data.

For the polyolefin copolymer compositions of this invention, $C_{pf}$ desirably is equal to or greater than 1.10, more desirably is equal to or greater than 1.15, even more desirably is equal to or greater than 1.20, preferably is equal to or greater than 1.30, more preferably is equal to or greater than 1.40, even more preferably is equal to or greater than 1.50, and still more preferably is equal to or greater than 1.60.

ATREF-DV

ATREF-DV has been described in U.S. Pat. No. 4,798,081, which is hereby incorporated by reference, and in "Determination of Short-Chain Branching Distributions of Ethylene copolymers by Automated Analytical Temperature Rising Elution Fractionation" (Auto-ATREF), *J. of Appl Pol Sci*: Applied Polymer Symposium 45, 25–37 (1990). ATREF-DV is a dual detector analytical system that is capable of fractionating semi-crystalline polymers like Linear Low Density Polyethylene (LLDPE) as a function of crystallization temperature while simultaneously estimating the molecular weight of the fractions. With regard to the fractionation, ATREF-DV is analogous to Temperature Rising Elution Fractionation (TREF) analysis that have been published in the open literature over the past 15 years. The primary difference is that this Analytical—TREF (ATREF) technique is done on a small scale and fractions are not actually isolated. Instead, a typical liquid chromatographic (LC) mass detector, such as an infrared single frequency detector, is used to quantify the crystallinity distribution as a function of elution temperature. This distribution can then be transformed to any number of alternative domains such as short branching frequency, comonomer distribution, or possibly density. Thus, this transformed distribution can then be interpreted according to some structural variable like comonomer content, although routine use of ATREF for comparisons of various LLDPE's is often done directly in the elution temperature domain.

To obtain ATREF-DV data, a commercially available viscometer especially adapted for LC analysis, such as a Viskotek™ is coupled with the IR mass detector. Together these two LC detectors can be used to calculate the intrinsic viscosity of the ATREF-DV eluant. The viscosity average molecular weight of a given fraction can then be estimated using appropriate Mark Houwink constants, the corresponding intrinsic viscosity, and suitable coefficients to estimate the fractions concentration (dl/g) as it passes through the detectors. Thus, a typical ATREF-DV report will provide the weight fraction polymer and viscosity average molecular weight as a function of elution temperature. $M_{pf}$ is then calculated using the equation given.

Molecular Weight Partitioning Factor

The molecular weight partitioning factor $M_{pf}$ is calculated from TREF/DV data. It characterizes the ratio of the average molecular weight of the fractions with high comonomer content to the average molecular weight of the fractions with low comonomer content. Higher and lower comonomer content are defined as being below or above the median elution temperature of the TREF concentration plot respectively, that is, the TREF data is divided into two parts of equal weight. $M_{pf}$ is calculated from the following equation:

$$M_{pf} = \frac{\frac{\sum_{i=1}^{n} w_i \cdot M_i}{\sum_{i=1}^{n} w_i}}{\frac{\sum_{j=1}^{m} w_j \cdot M_j}{\sum_{j=1}^{m} w_j}},$$

where: $M_i$ is the viscosity averale molecular weight and and $w_i$ $w_i$ is the normalized weight fraction as determined by ATREF-DV for the n data points in the fractions below the median elution temperature. $M_j$ is the viscosity average molecular weight and $w_j$ is the normalized weight fraction as determined by ATREF-DV for the m data points in the fractions above the median elution temperature. Only those weight fractions, $w_i$ or $w_j$ which have associated viscosity average molecular weights greater than zero are used to calculate $M_{pf}$. For a valid calculation, it is required that n and m are greater than or equal to 3.

For the polyolefin copolymer compositions of this invention, $M_{pf}$ desirably is equal to or greater than 1.15, more desirably is equal to or greater than 1.30, even more desirably is equal to or greater than 1.40, preferably is equal to or greater than 1.50, more preferably is equal to or greater than 1.60, even more preferably is equal to or greater than 1.70.

Activation Energy as an Indicator of Long Chain Branching

The significance and determination of the activation energy of flow, which represents the temperature dependence of the viscosity, has been described extensively (J. M. Dealy and K. F. Wissbrun, "Melt Rheology and its Role in Plastics Processing", Van Nostrand Reinhold, New York (1990)). For polyolefins, the Arrhenius equation is generally used to describe the temperature dependence of viscosity since T>Tg+100 (that is, the melt temperature (T) is greater than the glass transition temperature (Tg)+100; if this inequality is not true the Williams-Landel-Ferry or WLF equation is used to describe the temperature dependence of the viscosity). It has also been well established that long chain branched polymers have higher activation energies than comparable linear polymers. These comparisons have been shown for homopolymer polyethylene, in which the activation energy for the linear homopolymer is about 6.5 kcal/mol as compared to about 12 to 14 kcal/mol for long chain branched polymers produced by the high pressure, free radical process. When using an activation energy technique as an indicator of long chain branching, one must be careful to take into account sources of extraneous effects such as crosslinking, comonomer content effects, or impurities such as cocatalyst residue.

For polyolefin copolymers, taking into account the effects described in the preceding paragraph, a value for the activation energy of about 8 kcal/mol or more in combination with greater $I_{21}/I_2$ than expected from the other structural properties of the compositions can be indicative of the presence of long chain branching, and especially a value for the activation energy of about 10 kcal/mol or more, in combination with greater $I_{21}/I_2$ than expected from the other structural properties of the compositions, definitely indicates the presence of long chain branching. The preferred polyolefin copolymer compositions of one embodiment of this invention desirably have at least about 0.01 long chain branches per 1000 carbon atoms along the polymer backbone, more desirably from about 0.01 to about 8 long chain branches per 1000 carbon atoms along the polymer backbone, preferably from about 0.01 to about 3 long chain branches per 1000 carbon atoms along the polymer backbone, more preferably from about 0.01 to about 1 long chain branches per 1000 carbon atoms along the polymer backbone, and still more preferably from about 0.02 to about 0.5 long chain branches per 1000 carbon atoms along the polymer backbone. It should be understood that, when long chain branching is measured by some experimental techniques, such as NMR, the units for the aforementioned ranges of values for the number of long chain branches are per 1000 total carbon atoms.

The temperature dependence of the viscosity for polyethylenes can be expressed in terms of an Arrhenius equation, in which the activation energy can be related to a shift factor, $a_T$, used to determine a mastercurve for the material by time-temperature superposition. The values of the shift factor $a_T$ are independent of molecular weight and molecular weight distribution (W. W. Graessley, "Viscoelasticity and Flow in Polymer Melts and Concentrated Solutions", in J. E. Mark et al., Ed., "Physical Properties of Polymers", $2^{nd}$ Ed., ACS, New York (1993); J. Wang and R. S. Porter, "On The Viscosity-Temperature Behavior of Polymer Melts", Rheol. Acta, 34, 496 (1995); R. S. Porter, J. P. Knox, and J. F. Johnson, "On the Flow and Activation Energy of Branched Polyethylene Melts", Trans. Soc. Rheol., 12, 409 (1968).), and thus the activation energy is independent of molecular weight and molecular weight distribution for polymers that obey an Arrhenius relationship between shift factors and inverse temperature. Others (V. R. Raju et al., "Properties of Amorphous and Crystallizable Hydrocarbon Polymers. IV. Melt Rheology of Linear and Star-Branched Hydrogenated Polybutadiene", J. Polym. Sci., Polym. Phys. Ed., 17, 1223

(1979).) have shown that the high activation energies (10–18 kcal/mol) of long chain branched polybutadienes as compared to that of linear polyethylene (6.4 kcal/mol) are related to long-chain branching. Variation of the activation energy among long chain branched samples was concluded to be due to variations in average branch lengths.

Determination of Activation Energy

Stabilization of Samples

If samples were received unstabilized, the samples were stabilized with the following stabilization package: 1250 ppm calcium stearate, 500 ppm Irganox 1076, and 800 ppm PEPQ. This stabilization package was dissolved in acetone, which was then gently poured over the sample. The sample was then placed in a vacuum oven and dried at a temperature of 50–60° C. until the sample was dry (approximately one day).

Molding of Samples

All samples were compression molded with a Tetrahedron MTP-8 Hot Press before Theological testing. A tray was used to contain the samples and to transfer the sample in and out of the press. A metal plate was placed on the tray, and a Mylar sheet was placed on top of the brass plate. The sample shims used were of approximately 2–3 mil thickness and slightly greater than 1 inch diameter in the form of a circle/disk. These shims were filled with sample. with up to 8 shims being used per molding. If many disks were required for a given sample, a 3 inch diameter shim was used. Another piece of Mylar was then placed over the top of the sample and over this was placed a metal plate. The tray with samples was then placed between the tetrahedron plates, which were at 350° F. The Tetrahedron plates are then brought together for 5 minutes with a force of 1500 pounds. The tray was then removed from the press and allowed to cool. An arc punch of 25 mm diameter was then used to cut the samples for rheological testing.

Rheological Testing

Rheological testing was performed on a Rheometrics RMS-800 with 25 mm diameter parallel plates in the dynamic mode. Before performing the flow activation energy experiments, two strain sweep experiments were performed to determine the percent strain to perform the activation energy experiments so that the testing would be performed in the linear viscoelastic region and the torque signals would be significant. One strain sweep experiment was performed at the highest test temperature (210° C.) at a low frequency (0.1 rad/s) to determine the minimum percent strain necessary to generate a significant torque signal. The second strain sweep was performed at the lowest temperature (170° C.) at the highest frequency (100 rad/s) to determine the maximum percent strain allowable to remain within the linear viscoelastic region. In general, the percent strain ranged from 10–30 percent depending upon the molecular weight/stiffness of the sample.

The activation energies were determined by performing a frequency sweep from 100 to 0.01 rad/s with five points per decade at 210, 190, and 170° C. with a percent strain as determined above. A separate 25 mm disk or plaque of material was used for each experiment. The Theological data were analyzed with the Rheometrics RHIOS 4.4 software. The following conditions were selected for the time-temperature superposition (t-T) and the determination of the flow activation energies (Ea) according to an Arrhenius equation, $a_T=\exp(E_a/RT)$, which relates the shift factor ($a_T$) to E (R is the gas constant, and T is the absolute temperature):

| | |
|---|---|
| Shift method: | 2D |
| Shift accuracy: | high |
| Interpolation: | spline |
| all at 190° C. reference temperature. | |

The polyolefin copolymer compositions of a preferred embodiment of this invention desirably have a flow activation energy of at least about 8 kcal/mol, more desirably of at least about 10 kcal/mol., preferably of at least about 12 kcal/mol and more preferably of at least about 15 kcal/mol.

The polyolefin copolymer compositions of this invention may be blended with a wide variety of other resins to achieve a desirable balance of physical properties, or for economic reasons. Generally, the physical properties of the blends are what would be expected from a weighted interpolation of the physical properties of the individual components, with the greatest deviations from linearity being seen when one of the blend components is small relative to the other.

Desirably, the blends of this invention comprise two or more resin components, (A) and (B), where the blend comprises from about 1 weight percent to about 99 weight percent of (A) and from about 99 weight percent to about 1 weight percent of one or more resins that are different from the (A) component. The (A) component may be any of the polyolefin copolymer compositions of this invention, while the (B) component may be any other resin which is not incompatible with component (A). Preferred (B) components are various polyolefins.

In one embodiment, where it is desirable that the (B) component predominate, the blend comprises from about 1 weight percent to about 30 weight percent of (A), and from about 99 weight percent to about 70 weight percent of (B) one or more resins that are different from the (A) component. If a greater disparity in the amounts of the components is desired, the blend comprises from about 1 weight percent to about 15 weight percent of (A) and from about 99 weight percent to about 85 weight percent of (B) one or more resins that are different from the (A) component.

In an alternative embodiment, where it is desirable that the (A) component predominate, the blend comprises from about 99 weight percent to about 70 weight percent of (A), and from about 1 weight percent to about 30 weight percent of (B) one or more resins that are different from the (A) component. If a greater disparity in the amounts of the components is desired, the blend comprises from about 99 weight percent to about 85 weight percent of (A), and from about 1 weight percent to about 15 weight percent of (B) one or more resins that are different from the (A) component.

EXAMPLES

Examples 1–3 are three samples taken on three successive days during a single polymerization run. The same catalyst was used throughout the run and basically the same polymerization conditions were maintained throughout the run.

Catalyst Preparation for Examples 1–3

(i) Treatment of Silica:

110 liters of hexane was placed in a 240 liter vessel under nitrogen and 0.75g of Stadis™ 425 (diluted at 1 weight percent in hexane) was added. Stadis™ 425 is a hydrocarbon based antistatic agent available from DuPont Chemicals. 5 Kg of Sylopol™ 948 silica (previously dried at 200° C. for 5 hours) was then added. 150 ml of water was then added at ambient temperature during a period of 1 hour. 16.67 moles of TEA was then added at 30° C. during a period of 1 hour. After a holding period of 30 minutes, the silica was washed 6 times with 130 liters of hexane.

(ii) Catalyst Fabrication:

The silica treated as above was dried and then 25 liters of toluene added. 59.59 liters of tris(pentafluorophenyl)boron solution in hexane (3.1 wt percent) was then added at ambient temperature during a period of 30 minutes. 3.38 liters of $C_5Me_4SiMe_2NCMe_3TiMe_2$ ((t-butylamido)(tetramethyl-$\eta^5$-cyclopentadienyl)dimethylsilanetitanium dimethyl) solution in hexane (12.25 wt percent) was then added at ambient temperature during a period of 15 minutes. The catalyst was then held at 25° C. for 1 hour, and a further 0.125 g of Stadis™ 425 added (diluted at 1 wt. percent in hexane). The catalyst was then dried at 40° C. under vacuum (20 mmHg) to give a free flowing powder with a brown/ochre color.

(iii) Polymerization Using Continuous Fluidized Bed Reactor for Examples 1–3:

Ethylene, n-hexene, hydrogen and nitrogen were fed into a continuous fluidized bed reactor of diameter 45 cm. Polymer product was continuously removed from the reactor. Operating conditions and properties of the composition are reported in Table 1.

7.85 wt percent, d=0.88 g/ml) by syringe. Then a solution of (t-butylamido)(tetramethyl-$\eta^5$-cyclopentadienyl)dimethylsilanetitanium-$\eta^4$-1,3-pentadiene in toluene (2.6 ml, 10.7 wt percent, d32 0.88 g/ml) was added by syringe. The suspension was shaken well for 5 minutes, then dried in vacuo at 20° C. to give a free-flowing pale green powder.

(iii) Polymerization Using a Semi-continuous Fluidized Bed Reactor:

Ethylene, n-hexene, hydrogen and nitrogen were fed into a batch fluidized bed reactor of diameter 15 cm. Starting with a seed bed of LLDPE powder (~1 Kg), catalyst was injected and polymerization carried out to increase the mass of the bed to approximately 3.5 Kg. Product was then withdrawn to leave approximately 1 Kg of the powder in the reactor. The steps of polymerization and product withdrawal were carried out 5 times in total to yield a product containing in the region of only 0.3 percent by weight of the starting bed. The product was a white free flowing powder of bulk density 0.36 g/cm$^3$. The average productivity of the catalyst was about 1000 g polymer/g catalyst. Operating conditions and properties of the composition are given in Table 1.

TABLE 1

|  | Example 1 | Example 2 | Example 3 | Example 4 | Example 5 | Example 6 |
|---|---|---|---|---|---|---|
| Resin Name |  |  |  |  |  |  |
| I(2.16), dg/min | 1.36 | 0.85 | 0.91 | 0.86 | 1.20 | 0.77 |
| I(21.6), dg/min | 43.8 | 26.7 | 29.1 | 20.9 | — | — |
| Density, g/cc | .9230 | .9158 | .9120 | .9178 | .9200 | .9153 |
| Mw | 86000 | 95400 | 95100 | — | 120000 | 94592 |
| Mw/Mn | 2.68 | 2.63 | 2.19 | 3.4 | 6 | 3.43 |
| Ea, kcal/mol | 13.15 | 11.07 | 10.31 | 7.39 | 19.2 | — |
| Cpf | 1.34 | 1.24 | 1.26 | 1.22 | 1.12 | 1.67 |
| Mpf | 1.52 | 1.52 | 1.63 | 1.8 | 1.23 | — |
| DSC PEAK, C | 119.86 | 117.99 | 117.9 | — |  |  |
| Temperature, C. | 80 | 80 | 80 | 70 | 80 | 65 |
| Comonomer | 1-Hexene | 1-Hexene | 1-Hexene | 1-Hexene | 1-Hexene | 1-Hexane |
| Catalyst Type | mono-Cp | mono-Cp | mono-Cp | mono-Cp | bridged bis Cp | bridged bis Cp |
| Activator | Borane | Borane | Borane | Borane | MAO | MAO |
| Gas Phase Operating Conditions |  |  |  |  |  |  |
| Total Press., Bar | 16 | 16 | 16 | 9 | 20.2 | 20 |
| Temp., C. | 80.5 | 80 | 80.3 | 70 | 80 | 65 |
| C2 Press., Bar | 6.7 | 7.2 | 7.2 | 8 | 11 | 12 |
| H2/C2 Press. | 0.003 | 0.0032 | 0.0033 | 0.0018 | 0.0011 | 0.005 |
| C6/C2 Press | 0.0034 | 0.0045 | 0.0048 | 0.0033 | 0.012 | 0.009 |
| Production, kg/hr | 10 | 10 | 15 |  | 11 | — |

Example 4

(i) Treatment of Silica:

A suspension of ES70 silica (7 kg, previously calcined at 500° C. for 5 hours) in 110 liters of hexane was made up in a 240 liter vessel under nitrogen. A solution of TEA in hexane (9.1 moles, 0.976M solution) was added slowly to the stirred suspension over 30 minutes, while maintaining the temperature of the suspension at 30° C. The suspension was stirred for a further 2 hours. The hexane was filtered, and the silica washed 4 times with hexane, so that the aluminum content in the final washing was less than 1 mmol Al/liter. Finally the suspension was dried in vacuo at 40° C. to give a free flowing treated silica powder.

(ii) Catalyst Fabrication:

Na-dried, distilled toluene (55 ml) was added to 13 g of the treated silica powder in a 250 ml round bottomed flask in a dry nitrogen glove box. To the suspension was added a solution of tris(pentafluorophenyl)boron in toluene (7.6 ml,

| Total pressure | 9 bar |
| Temperature | 70° C. |
| Pressure C2 | 8 bar |
| Pressure H2/C2 | 0.0018 |
| Pressure C6/C2 | 0.0033 |

Example 4A (i) Treatment of Silica:

A suspension of ES70 silica (7 kg, previously calcined at 500° C. for 5 hours) in 110 liters of hexane was made up in a 240 liter vessel under nitrogen. A solution of TEA in hexane (9.1 moles, 0.976M solution) was added slowly to the stirred suspension over 30 minutes, while maintaining the temperature of the suspension at 30° C. The suspension was stirred for a further 2 hours. The hexane was filtered, and the silica washed 4 times with hexane, so that the aluminum content in the final washing was less than 1 mmol Al/liter. Finally the suspension was dried in vacuo at 40° C. to give a free flowing treated silica powder.

(ii) Catalyst Fabrication:

Na-dried, distilled toluene (55 ml) was added to 13 g of the treated silica powder in a 250 ml round bottomed flask in a dry nitrogen glove box. To the suspension was added a solution of tris(pentafluorophenyl)boron in toluene (7.6 ml, 7.85 wt percent, d=0.88 g/ml) by syringe. Then a solution of (t-butylamido)(tetramethyl-$\eta^5$-cyclopentadienyl) dimethylsilanetitanium-$\eta^4$-3-methyl-1,3-pentadiene in toluene (2.6 ml, 10.7 wt percent, d=0.88 g/ml) was added by syringe. The suspension was shaken well for 5 minutes, then dried in vacuo at 20° C. to give a free-flowing pale green powder.

(iii) Polymerization Using a Semi-continuous Fluidized Bed Reactor:

Ethylene, n-hexene, hydrogen and nitrogen were fed into a batch fluidized bed reactor of diameter 15 cm. Starting with a seed bed of LLDPE powder (~1 Kg), catalyst was injected and polymerization carried out to increase the mass of the bed to approximately 3.5 Kg. Product was then withdrawn to leave approximately 1 Kg of the powder in the reactor. The steps of polymerization and product withdrawal were carried out 5 times in total to yield a product containing in the region of only 0.3 percent by weight of the starting bed. The product was a white free flowing powder of bulk density 0.36 g/cm³. The average productivity of the catalyst was about 1000 g polymer/g catalyst. Operating conditions and properties of the composition are given in Table 1.

| Total pressure | 9 bar |
|---|---|
| Temperature | 70° C. |
| Pressure C2 | 8 bar |
| Pressure H2/C2 | 0.0018 |
| Pressure C6/C2 | 0.0033 |

Example 5

Catalyst Preparation:

The catalyst was prepared in an inert atmosphere vessel of volume 110 liters maintained under an inert atmosphere. Mixing was applied throughout using a paddle stirrer operated at 20 rev/min. 7.5 moles of MAO (1.6 mole/liter in toluene) were added at ambient temperature. A further 3.88 liters of toluene was added to rinse the addition system. 100 mM of ethylene-bridged bis(indenyl)zirconium dichloride diluted in 2.3 liters of toluene was then added and a further 1 liter 10 of toluene for rinsing. The temperature was raised to 800C and maintained at this value for 1 hour, and then cooled to 50° C. and 2 Kg of ES70 silica (dried for 5 hours at 800° C.) was added. The temperature was raised to 80° C. and maintained for 2 hours 0.5 g of Stadis™ 425 antistatic agent in 0.51 of toluene was then added and the catalyst dried at 70° C. under vacuum (700 torr)

Polymerization Using Continuous Fluidized Bed Reactor for Example 5:

Ethylene, n-hexene, hydrogen and nitrogen were fed into a continuous fluidized bed reactor of diameter 45 cm. Polymer product was continuously removed from the reactor through a valve. Operating conditions are as follows:

| Total pressure | 20.2 bar |
|---|---|
| Temperature | 80° C. |
| Pressure C2 | 11 bar |
| Pressure H2/C2 | 0.0011 |
| Pressure C6/C2 | 0.012 |

The properties of the composition are given in Table 1. The value of activation energy found by flow activation analysis was 19.2 kcal/mol, which indicates significant long chain branching.

Example 6

Catalyst Preparation

The catalyst was prepared in an inert atmosphere vessel of volume 110 liters maintained under an inert atmosphere. Mixing was applied throughout using a paddle stirrer operated at 20 rev/min. 48.8 moles of MAO (1.85 mole/liter in toluene) were added at ambient temperature. A further 3.88 liters of toluene was added to rinse the addition system. 650 mM of ethylene-bridged bis(indenyl)zirconium dichloride diluted in 5 liters of toluene was then added and a further 1.2 liter of toluene for rinsing. The temperature was raised to 80° C. and maintained at this value for 1 hour, and then cooled to 50° C. and 13 kg of ES70 silica (dried for 5 hours at 800° C.) was added.

The temperature was raised to 80° C. and maintained for 2 hours 0.5 g of Stadis™ 425 antistatic agent in 0.11 of toluene was then added and the catalyst dried at 70° C. under vacuum (700 mmHg).

Polymerization Using Continuous Fluidized Bed Reactor for Example 5:

Ethylene, n-hexene, hydrogen and nitrogen were fed into a continuous fluidized bed reactor of diameter 74 cm. Polymer product was continuously removed from the reactor through a valve. Operating conditions are as follows:

| Total pressure | 20.2 bar |
|---|---|
| Temperature | 65° C. |
| Pressure C2 | 12 bar |
| Pressure H2/C2 | 0.005 |
| Pressure C6/C2 | 0.009 |

The properties of the compostion are given in Tabel 1.

Examples 100–104

The same catalyst formula and preparation method as for Examples 1–3 was used for preparation of the catalyst for these examples. However, only 3.5 Kg of silica was used and the quantities of all other components were scaled down accordingly. Polymerization was carried out in the same continuous fluidized bed reactor of diameter 45 cm. Operating conditions and properties of the composition are reported in Table 1A.

In the Tables that follow $I_2$ and $I_{21}$ were determined by ASTM D-1238 and density by ASTM D-1505.

TABLE 1A

| | Example 100 | Example 101 | Example 102 | Example 103 | Example 104 | Example 105 | Example 106 | Example 107 |
|---|---|---|---|---|---|---|---|---|
| I(2.16), dg/min | 0.85 | 0.84 | 3.70 | 3.00 | 2.00 | 0.96 | 1.41 | 0.96 |
| I(21.6), dg/min | 27 | 25.6 | 94 | 78 | 57 | 21.7 | 44 | 24.5 |
| Density, g/cc | .9170 | .9160 | .9202 | .9200 | .9178 | .9161 | .9190 | .9195 |
| Mw | | | | | | | 78900 | 92800 |
| Mw/Mn | | | | | | | 3.246 | 3.135 |
| Ea, kcal/mol | 13.4 | 14.7 | 8.9 | 7.8 | 10.2 | 7.66 | 13.3 | 11.1 |
| Cpf | 1.4 | 1.27 | 1.44 | 1.4 | 1.31 | 1.38 | 1.32 | 1.3 |
| Mpf | 1.89 | 1.52 | 1.81 | 1.84 | 1.68 | | 1.54 | 1.52 |
| DSC PEAK, C | | | | | | | 119.13 | 119.65 |
| Temperature, C. | 75 | 80 | 75 | 75 | 75 | 71 | 75 | 74 |
| Comonomer | C6 | C6 | C6 | C6 | C6 | C6 | C6 | C6 |
| Catalyst Type | mono-Cp | mono-Cp | mono-Cp | mono-Cp | mono-Cp | mono-Cp | mono-Cp | mono-Cp |
| Activator | Borane | Borane | Borane | Borane | Borane | Borane | Borane | Borane |
| Gas Phase Operating Conditions | | | | | | | | |
| Total Press., Bar | 16 | 16 | 16 | 16 | 16 | 18 | 16 | 16 |
| Temp., C. | 75 | 80 | 75 | 75 | 75 | 71 | 75 | 74 |
| C2 Press., Bar | 7.4 | 7.4 | 9 | 9.7 | 9.7 | 8.7 | 6.3 | 7.6 |
| H2/C2 Press. | 0.0035 | 0.004 | 0.0048 | 0.0042 | 0.0039 | 0.0019 | 0.0025 | 0.0032 |
| C6/C2 Press | 0.0032 | 0.0032 | 0.0032 | 0.0034 | 0.0035 | 0.0039 | 0.0036 | 0.0038 |
| Production, kg/hr | 14 | 12 | 9 | 13 | 12 | 8 | 65 | 50 |

Catalyst Preparation for Example 105
(i) Treatment of Silica:

110 liters of hexane was placed in a 240 liter vessel under nitrogen and 0.75 g of Stadis 425, diluted at 1 wt % in hexane, was added. 2.9 Kg of Crossfield ES70 silica, which had previously been dried at 500° C. for 5 hours, and which contained 1.1 mM OH/g) was then added. 3.75 moles of TEA was then added at 30° C. during a period of 1 hour. After a holding period of 30 minutes, the silica was washed with hexane to eliminate excess TEA and to reach the targeted aluminum in the supernatent of 1 mM per liter of hexane.

(ii) Catalyst Fabrication:

The silica treated as above was dried and then 10.4 liters of toluene added. 0.2 moles of tris(pentafluorophenyl)boron solution in toluene (7.85wt %) was then added at ambient temperature during a period of 30 minutes. 0.15 moles of (t-butylamido)(tetramethyl-$\eta^5$-cyclopentadienyl)dimethylsilanetitanium-$\eta^4$-1,3-pentadiene in toluene (10.17 wt %) was then added at ambient temperature during a period of 15 minutes. A further 0.125 g of Stadis 425 was added (diluted at 1 wt % in hexane). The catalyst was then dried at 40° C. under vacuum (20 mmHg) to give a free flowing powder with a green color.

(iii) Polymerization Using Continuous Fluidized Bed Reactor for Examples 105:

Ethylene, n-hexene, hydrogen and nitrogen were fed into a continuous fluidized bed reactor of diameter 45 cm. Polymer product was continuously removed from the reactor. Operating conditions are given in Table 1A.

Example 106

The same catalyst formula and preparation method as for Examples 1–3 was used for preparation of the catalyst for example 106. However, 10 Kg of silica was used and the quantities of all other components were scaled up accordingly. Polymerization was carried out in a continuous fluidized bed reactor of diameter 74 cm. Operating conditions and properties of the composition are reported in Table 1A.

Example 107

The same catalyst formula and preparation method as for Example 105 was used for preparation of the catalyst for Example 107. However, 17 Kg of silica was used and the quantities of all other components were scaled up accordingly. Polymerization was carried out in a continuous fluidized bed reactor of diameter 74 cm. Operating conditions and properties of the composition are reported in Table 1A.

Comparative Examples A–F

Comparative Examples A–F are commercially available materials which were tested and compared under the same conditions to the compositions of Examples 1–6. The data for the comparatives are in Table 2.

TABLE 2

| | Comparative A | Comparative B | Comparative C | Comparative D | Comparative E | Comparative F |
|---|---|---|---|---|---|---|
| Resin Name | INNOVEX 7209 AA | EXCEED 401 | Novapol TD9022 | DOWLEX 2056A | AFFINITY FM 1570 | Enhanced PE |
| I(2.16), dg/min | 0.90 | 4.50 | 0.87 | 1.00 | 1.00 | 0.85 |
| I(21.6), dg/min | — | — | — | — | — | — |
| Density, g/cc | .9200 | .9170 | .9170 | .9200 | 0.915 | .9200 |
| Mw | — | | 124200 | 113100 | 74700 | 118700 |
| Mw/Mn | | 2.3 | 2.9 | 4.03 | 2.24 | 3.363 |
| Ea, kcal/mol | 6.82 | 8.47 (see pg 49) | — | 7.28 | 14.1 | |
| Cpf | <1 | — | <1 | — | 1.06 | — |
| Mpf | 0.45 | 1.11 | 0.61 | 0.62 | 0.73 | 2.32 |
| DSC PEAK, C | | 116 | 124 | 122 | | |

TABLE 2-continued

|  | Comparative A | Comparative B | Comparative C | Comparative D | Comparative E | Comparative F |
|---|---|---|---|---|---|---|
| Temperature, C. | — | — | — | 195 | — | — |
| Comonomer | 4-methyl-pentene | 1-Hexene | 1-Hexene | 1-Octene | 1-Octene | 1-Octene |
| Catalyst Type | Traditional Ziegler-Natta | bis-Cp | Traditional Ziegler-Natta | Traditional Ziegler-Natta | mono-Cp |  |
| Promoter Type |  |  |  |  |  |  |
| Gas Phase Operating Conditions |  |  |  |  |  |  |
| Total Press., Bar |  |  | — | — | — | — |
| Temp., C. |  |  | — | — | — | — |
| C2 Press., Bar |  |  | — | — | — | — |
| H2/C2 Press. |  |  | — | — | — | — |
| C6/C2 Press |  |  | — | — | — | — |
| Production, kg/hr |  |  | — | — | — | — |

Comparative A is Innovex™ 7209, a commercially available gas phase produced polyethylene produced by BP Chemicals using a traditional Ziegler-Natta catalyst.

Comparative B is Exxon Exceed™ 401, a commercially available gas phase produced polyethylene produced by Exxon Chemical using a metallocene catalyst. (Note: A second sample of this material was evaluated, and a value for $E_a$ of 7.53 kcal/mol was determined, as well as a value for $I_{21}$ of 77.92 and $I_{10}$ of 27.02, and, thus, a value of $I_{21}/I_2$ of 17.3 and $I_{10}/I_2$ of 6.0. In addition, the critical shear rate at the onset of surface melt fracture was 294 $s^{-1}$ at a shear stress of $2.15 \times 10^6$ dyn/cm$^2$ and the critical shear rate at the onset of gross melt fracture was 795 $s^{-1}$ at a shear stress of $3.45 \times 10^6$ dyn/cm$^2$. This data indicates the absence of long chain branching.)

Comparative C is Novapol™ TD902, a commercially available gas phase produced polyethylene produced by Novascor™ using a traditional Ziegler-Natta catalyst.

Comparative D is DOWLEX™ 2056A, a commercially available solution process polyethylene produced by The Dow Chemical Company using a traditional Ziegler-Natta catalyst.

Comparative E is AFFINITY™ FM 1570, a commercially available solution process polyethylene produced by The Dow Chemical Company using a constrained geometry metallocene catalyst.

Comparative F is enhanced polyethylene XU-59900.00, a commercially available solution process polyethylene produced by The Dow Chemical Company.

The improved processability observed for the compositions of Examples 2a (see note 5 below) and 3 are due to the presence of long chain branching in the polymer. DOWLEX™ 2056A, produced by the solution process using Ziegler-Natta catalyst, contains no long chain branching. The presence of long chain branching results in higher melt strength which was measured by a Goettfert Rheotens apparatus. The data is reported in Table 3.

TABLE 3

|  | DOWLEX ™ 2056A | EX 2a | EX 3 |
|---|---|---|---|
| Resin Properties |  |  |  |
| Melt Index, dg/min. | 1.0 | 1.1 | 0.91 |
| Density, g/cc | 0.920 | 0.915 | 0.912 |
| Processability[1] |  |  |  |
| Motor Current, amp. | 65 | 53 | 56 |
| Pressure, psig | 2690 | 2610 | 2770 |
| Screw Power, hp | 15 | 13 | 12 |
| Bubble Stability[2] |  |  |  |
| Melt Strength, cN | 4 | 9 | 7 |
| Sealing Properties[3] |  |  |  |
| Seal Strength, lb. | 4.2 | 4.6 | 4.7 |
| Hot Tack, lb. | 0.4 | 2.7 | 2.8 |
| Film Toughness[4] |  |  |  |
| Dart Impact Strength, g | 86 | 850 | 850 |

Notes:
[1]Gloucester Film Line, 2.5-inch screw, 6-inch barrel, 70 mil die gap, 120 lb/hr polymer extrusion rate
[2]Melt Strength at 190° C. and 120 mm/s velocity
[3]2.0 mil film, seal strength at 120° C., Hot tack at 110° C.
[4]0.8 mil blown film; Dart "B" test ASTM D-1709
[5]Material of Example 2a was produced in the run which gave Examples 1–3 on the same day as Example 2, but at a lower density.

The polyolefin copolymer compositions of this invention have mechanical properties, such as dart impact strength, optical properties and heat sealing properties which are superior to conventional Ziegler produced compositions of comparable density.

They also have processability characteristics, as measured, for example, by melt strength and melt flow ratio, which are superior to conventional metallocene products of comparable density and melt index, and in especially preferred embodiments, to conventional Ziegler materials as well. The polyolefin copolymer compositions also offer the advantage that they can be manufactured using a single catalyst in a single reactor process. In the preferred embodiment, the materials of the invention can be extruded through conventional polyethylene extruders with lower power requirements, lower extruder pressures, and lower melt temperatures then conventional Ziegler-Natta and conventional metallocene products.

Films and other articles of manufacture produced with the polyolefin copolymer compositions of this invention desirably have a melt strength of greater than 4 CNN, preferably equal to or greater than 7, more preferably equal to or greater than 9. The seal strength desirably is greater than 4.2 lb., preferably equal to or greater than 4.6 lb., more preferably equal to or greater than 4.8 lb. The hot tack is desirably is greater than 0.5 lb., preferably equal to or greater than 1.0 lb., more preferably equal to or greater than 2.0 lb. The dart impact strength desirably is greater than 100 g, more desirably greater than 200 g, preferably equal to or greater than 500 g, more preferably equal to or greater than 700, and even more preferably equal to or greater than 850 g.

Blends of the polyolefin copolymer composition with ethylene homopolymer

Blends of the polyolefin copolymer composition of this invention with an ethylene homopolymer produced by a high pressure tubular process have been prepared and studied. Polyolefin copolymer compositions designated by L022, from Example 100, and L023, from Example 101, were individually blended with an ethylene homopolymer resin (LDPE 501I) at levels between 0 and 100 per cent. None of these resins contained slip or antiblock additives, except the LDPE 501I, which was stabilized with 500 ppm Irganox 1076, a phenolic antioxidant. Characteristics of the resins used for the blends is reported in Table 4.

TABLE 4

Resin Properties

| Resin | Melt Index | Density | Description |
|---|---|---|---|
| L022 | 0.89 | 0.9161 | Gas Phase-Substantially linear ethylene polymer, INSITE ™ Catalyst |
| L023 | 0.85 | 0.9177 | Gas Phase-Substantially linear ethylene polymer, INSITE ™ Catalyst |
| 501I | 1.90 | 0.9220 | Ethylene Homopolymer, High pressure Tubular process |

Data related to the composition of these blends and the unblended materials are presented for Samples A through G in Table 5.

TABLE 5

Blend Composition

| | Weight % Resin | | |
|---|---|---|---|
| Sample | L022 | L023 | LDPE |
| A | 100 | 0 | 0 |
| B | 90 | 0 | 10 |
| C | 20 | 0 | 80 |
| D | 0 | 0 | 100 |
| E | 0 | 100 | 0 |
| F | 0 | 95 | 5 |
| G | 0 | 20 | 80 |

Blending LDPE into the substantially linear low density polymer of this invention gave improvements in processability relative to the unblended polyolefin copolymer composition of this invention due to the increase in amounts of long chain branching, and as demonstrated by a reduction in extruder amps and pressure. Data related to processability are shown in Table 6. The blends also provide significant improvements in optical characteristics, as shown by a reduction in haze and an increase in both clarity and gloss relative to the unblended polyolefin copolymer composition of this invention, which is evident from the data in Table 7.

TABLE 6

Processability

| | Extruder Conditions | | | | |
|---|---|---|---|---|---|
| Sample | rpm | lb/hr | Melt Temp | amp | psi |
| A | 57.2 | 120 | 442 | 51 | 2260 |
| B | 57.6 | 120 | 442 | 55 | 2440 |
| C | 54 | 120 | 438 | 36 | 1310 |
| D | 58.6 | 120 | 434 | 34 | 990 |
| E | 58.9 | 117 | 442 | 54 | 2510 |
| F | 58.6 | 119 | 442 | 55 | 2570 |
| G | 53.8 | 120 | 438 | 37 | 1450 |

TABLE 7

Optical Characteristics

| Sample | Clarity | Gloss 20 deg. | Gloss 45 deg. |
|---|---|---|---|
| A | 91.6 | 44.1 | 61.1 |
| B | 92.9 | 59.2 | 66.7 |
| C | 93.1 | 57.5 | 71.5 |
| D | 95.5 | 74.1 | 76.1 |
| E | 90.2 | 49.5 | 62.2 |
| F | 92.2 | 59.3 | 66 |
| G | 92.5 | 54.4 | 69.6 |

For films made with the blends there was a noted improvement in heat seal initiation temperature, as indicated by a reduction in temperature required to obtain a 2 pound Heat Seal, and in the final Seal Strength in pounds, relative to the unblended polyolefin copolymer composition of this invention. Data related to this aspect of Heat Seal and Seal Strength are presented in Table 8.

TABLE 8

Heat Seal/Seal Strength

| % LDPE | Heat Seal Initiation Temp. | Seal Strength, lb. |
|---|---|---|
| 0 | 109 C. | 2.1 |
| 10 | 108 C. | 2.2 |
| 80 | 104 C. | 2.9 |
| 100 | 102 C. | 2.7 |

As levels of the homopolymer LDPE resin were increased, an accompanying decrease in film strength, or mechanical properties, relative to the unblended polyolefin copolymer composition of this invention, was observed as the linear nature of the blend was decreased. Reductions in the mechanical properties are shown in Table 10 below.

Blending the polyolefin copolymer composition of this invention into a LDPE homopolymer gave improvements in the resulting film physical properties such as Ultimate Tensile Strength, Dart Impact Resistance, Elmendorf Tear, and Hot Tack Strength, relative to the unblended LDPE.

Hot Tack Strength is the strength, in Newtons, required to pull apart two films in a partially molten condition. This test is used to simulate the ability of a package to hold its seal, and not spill the contents, while the heat seal has not yet cooled. As the polyolefin copolymer composition of this invention was blended into the LDPE, the hot tack strength increased as did the temperature range in which the hot tack was observed. The data are presented in Table 9.

TABLE 9

Hot Tack

| % LDPE | Hot Tack strength, N | Temperature Range, C. |
|---|---|---|
| 0 | 3.4 | 35 |
| 10 | 3.4 | 25 |
| 80 | 1.8 | 15 |
| 100 | 1.6 | 10 |

MD Elmendorf tear, being relatively low for the polyolefin copolymer compositions of this invention, was relatively unaffected by the addition of LDPE. The orientation effect did vary the CD tear. The dart impact for the polyolefin copolymer compositions of this invention is quite high, and only slightly affected at moderate levels of blending with LDPE. Data for these film physical properties are given in Table 10.

TABLE 10

Film Physical Properties

| | Description | | | Elmendorf Tear | | Dart Impact |
|---|---|---|---|---|---|---|
| Sample | L022 | L023 | LDPE | MD | CD | grams |
| A | 100 | 0 | 0 | 187 | 317 | 658 |
| B | 90 | 0 | 10 | 186 | 613 | 654 |
| C | 20 | 0 | 80 | 162 | 256 | 100 |
| D | 0 | 0 | 100 | 152 | 238 | 100 |
| E | 0 | 100 | 0 | 168 | 646 | 508 |
| F | 0 | 95 | 5 | 155 | 726 | 556 |
| G | 0 | 20 | 80 | 166 | 650 | 100 |

Thus, it is clear that, while the high strength of the polyolefin copolymer compositions of this invention were compromised to some degree by blending with an LDPE homopolymer, other properties may be advantageously affected. Similarly, while some properties of an unblended LDPE homopolymer may be adversely affected by blending with the polyolefin copolymer composition of this invention, the strength of the blend is superior to unblended LDPE.

What is claimed is:

1. A polyolefin copolymer composition produced with a catalyst having a metallocene complex in a single reactor in a process for the polymerization of an α-olefin monomer with one or more olefin comonomers, the composition having a molecular weight maximum which occurs in that 50 percent by weight of the composition which has the highest weight percent comonomer content, as expressed by having a comonomer partitioning factor $C_{pf}$ which is equal to or greater than 1.10 and/or a molecular weight partitioning factor $M_{pf}$ which is equal to or greater than 1.15, where the comonomer partitioning factor $C_{pf}$ is calculated from the equation:

$$C_{pf} = \frac{\frac{\sum_{i=1}^{n} w_i \cdot c_i}{\sum_{i=1}^{n} w_i}}{\frac{\sum_{j=1}^{m} w_j \cdot c_j}{\sum_{j=1}^{m} w_j}},$$

where $c_i$ is the mole fraction comonomer content and $w_i$ is the normalized weight fraction as determined by GPC/FTIR for the n FTIR data points above the median molecular weight, $c_j$ is the mole fraction comonomer content and $w_j$ is the normalized weight fraction as determined by GPC/FTIR for the m FTIR data points below the median molecular weight, wherein only those weight fractions $w_i$ or $w_j$ which have associated mole fraction comonomer content values are used to calculate $C_{pf}$ and n and m are greater than or equal to 3; and where the molecular weight partitioning factor $M_{pf}$ is calculated from the equation:

$$M_{pf} = \frac{\frac{\sum_{i=1}^{n} w_i \cdot M_i}{\sum_{i=1}^{n} w_i}}{\frac{\sum_{j=1}^{m} w_j \cdot M_j}{\sum_{j=1}^{m} w_j}},$$

where $M_i$ is the viscosity average molecular weight and $w_i$ is the normalized weight fraction as determined by ATREF-DV for the n data points in the fractions below the median elution temperature, $M_j$ is the viscosity average molecular weight and $w_j$ is the normalized weight fraction as determined by ATREF-DV for the m data points in the fractions above the median elution temperature, wherein only those weight fractions, $w_i$ or $w_j$ which have associated viscosity average molecular weights greater than zero are used to calculate $M_{pf}$ and n and m are greater than or equal to 3, wherein the composition has at least 0.01 long chain branches per 1000 carbon atoms along the polymer backbone.

2. The polyolefin copolymer composition of claim 1 wherein $C_{pf}$ is equal to or greater than 1.15.

3. The polyolefin copolymer composition of claim 2 wherein $C_{pf}$ is equal to or greater than 1.20.

4. The polyolefin copolymer composition of claim 1 wherein $M_{pf}$ is equal to or greater than 1.30.

5. The polyolefin copolymer composition of claim 4 wherein $M_{pf}$ is equal to or greater than 1.50.

6. The polyolefin copolymer composition of claim 1 wherein the density of the composition is from 0.87 to 0.96 g/cm².

7. The polyolefin copolymer composition of claim 6 wherein the density of the composition is from 0.90 to 0.94 g/cm³.

8. The polyolefin copolymer composition of claim 7 wherein the density of the composition is from 0.910 to 0.925 g/cm³.

9. The polyolefin copolymer composition of claim 1 wherein the composition has a melt index $I_2$ of from 0.01 to 150.

10. The polyolefin copolymer composition of claim 1 wherein the composition has an $I_{21}/I_2$ which is equal to or greater than 24.

11. The polyolefin copolymer composition of claim 1 wherein the composition has a Mw/Mn of from 2.0 to 10.

12. The polyolefin copolymer composition of claim 1 wherein the composition has an $I_{21}/I_2$ which is equal to or greater than 24 and a Mw/Mn of from 2.0 to 3.5.

13. The polyolefin copolymer composition of claim 1 wherein the composition has a flow activation energy of at least 8 kcal/mol.

14. The polyolefin copolymer composition of claim 13 wherein the composition has a flow activation energy of at least 10 kcal/mol.

15. The polyolefin copolymer composition of claim 14 wherein the composition has a flow activation energy of at least 12 kcal/mol.

16. The polyolefin copolymer composition of claim 1 wherein the composition has from 0.01 to 8 long chain branches per 1000 carbon atoms along the polymer backbone.

17. The polyolefin copolymer composition of claim 1 wherein the olefin comonomer is propene, 1-butene, 1-pentene, 4-methyl-1-pentene, 1-hexene, 1-heptene, 1-octene, 1-nonene, 1-decene, 1,7-octadiene, 1,5-hexadiene, 1,4-pentadiene, 1,9-decadiene, ethylidenenorbornene, styrene or a mixture thereof.

18. The polyolefin copolymer composition of claim 1 wherein the composition contains in polymerized form from 0.01 to 99.99 mole percent ethylene as the monomer and from 99.99 to 0.01 mole percent of one or more olefin comonomers.

19. The polyolefin copolymer composition of claim 18 wherein the composition contains in polymerized form from 0.1 to 99.99 mole percent ethylene as the monomer and from 99.99 to 0.1 mole percent of one or more olefin comonomers.

20. The polyolefin copolymer composition of claim 19 wherein the composition contains in polymerized form from 50 to 99.99 mole percent ethylene as the monomer and from 50 to 0.1 mole percent of one or more olefin comonomers.

21. The polyolefin copolymer composition of claim 20 wherein the composition contains in polymerized form from 96 to 99.9 mole percent ethylene as the monomer and from 4 to 0.1 mole percent of one or more olefin comonomers.

22. The polyolefin copolymer composition of claim 1 wherein the composition contains in polymerized form from 0.01 to 99.99 weight percent propylene as the monomer and from 99.99 to 0.01 weight percent of one or more olefin comonomers.

23. The polyolefin copolymer composition of claim 1 wherein the composition has been produced with a mono-Cp catalyst.

24. The polyolefin copolymer composition of claim 23 wherein the metallocene complex of the catalyst has a central metal Ti in which the formal oxidation state is +2.

25. The polyolefin copolymer composition of claim 24 wherein the composition has been produced with a catalyst having a metallocene complex of the formula:

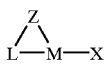

wherein:
M is titanium or zirconium in the +2 formal oxidation state;
L is a group containing a cyclic, delocalized anionic, π-system through which the group is bound to M, and which group is also bound to Z;
Z is a moiety bound to M via σ-bond, comprising boron, and the members of Group 14 of the Periodic Table of the Elements, and also comprising an element selected from the group consisting of nitrogen, phosphorus, sulfur and oxygen, said moiety having up to 60 non-hydrogen atoms; and
X is a neutral, conjugated or nonconjugated diene, optionally substituted with one or more groups selected from hydrocarbyl or trimethylsilyl groups, said X having up to 40 carbon atoms and forming a complex with M.

26. The polyolefin copolymer composition of claim 23 wherein the metallocene complex of the catalyst has a central metal Ti in which the formal oxidation state is +3 or +4.

27. The polyolefin copolymer composition of claim 1 wherein the composition has been produced with a bis-Cp metallocene catalyst.

28. The polyolefin copolymer composition of claim 27 wherein the composition has been produced with a bridged bis-Cp metallocene catalyst.

29. The polyolefin copolymer composition of claim 28 wherein the composition has been produced with a catalyst having a metallocene complex of the formula:

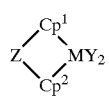

wherein
$Cp^1$, $Cp^2$ are independently a substituted or unsubstituted indenyl or hydrogenated indenyl group;
Y is a univalent anionic ligand, or $Y_2$ is a diene;
M is zirconium, titanium or hafnium; and
Z is a bridging group comprising an alkylene group having 1 to 20 carbon atoms or a dialkyl silyl- or germyl-group, or alkyl phosphine or amine radical.

30. The polyolefin copolymer composition of claim 1 wherein the catalyst has a single metallocene complex.

31. The polyolefin copolymer composition of claim 1 wherein the catalyst is supported on a support material.

32. The polyolefin copolymer composition of claim 31 wherein the support material is an inorganic oxide or magnesium halide.

33. The polyolefin copolymer composition of claim 32 wherein the support material is silica, alumina, silica-alumina, or a mixture thereof.

34. The polyolefin copolymer composition of claim 33 wherein the support material is silica.

35. The polyolefin copolymer composition of claim 31 wherein the support material is a polymer.

36. The polyolefin copolymer composition of claim 1 wherein the process is a continuous process conducted in a single gas phase reactor.

37. The polyolefin copolymer composition of claim 1 wherein the composition is produced in a reactor with a reaction zone having a temperature of 60° C. or higher.

38. The polyolefin copolymer composition of claim 37 wherein the composition Us produced in a reactor with a reactor zone having a temperature of 70° C. or higher.

39. The polyolefin copolymer composition of claim 1 wherein the comonomer to monomer molar ratio is less than 0.02.

40. The polyolefin copolymer composition of claim 1 wherein the hydrogen to monomer molar ratio is less than 0.02.

41. The polyolefin copolymer composition of claim 1 wherein the composition has a short chain branching distribution that is multimodal, or wherein the composition has a molecular weight distribution that is multimodal.

42. The polyolefin copolymer composition of claim 1 wherein the density of the composition is from 0.910 to 0.925, the comonomer to monomer molar ratio is less than 0.02, the hydrogen to monomer ratio is less than 0.02, and the composition is produced in a reactor with a reaction zone having a temperature of 70° C. or higher.

43. A polyolefin copolymer composition according to claim 1 produced in a continuous gas phase process.

44. A polyolefin copolymer composition according to claim 1 produced with a catalyst having a bis-Cp metallocene complex.

45. A polyolefin copolymer composition according to claim 1 produced with a catalyst having an organometallic compound.

46. A film or other article of manufacture produced with the polyolefin copolymer composition of claim 1 which has a melt strength of greater than 4 cN, or which has a seal strength of greater than 1.9 kg (4.2 lb.), or which has a hot tack greater than 0.23 kg (0.5 lb.), or which·has a dart impact strength greater than 100 g.

47. The polyolefin copolymer composition of claim 16 wherein the composition has from 0.01 to 3 long chain branches per 1000 carbon atoms along the polymer backbone.

48. A process for producing a polyolefin copolymer composition comprising reacting an α-olefin monomer with one or more olefin comonomers using a metallocene catalyst in a single reactor to form a polyolefin copolymer composition having at least 0.01 long chain branches per 1000 carbon atoms along the polymer backbone and a molecular weight maximum which occurs in that 50 percent by weight of the composition which has the highest weight percent comonomer content, as expressed by having a comonomer partitioning factor $C_{pf}$ which is equal to or greater than 1.10 and/or a molecular weight partitioning factor $M_{pf}$ which is equal to or greater than 1.15, where the comonomer partitioning factor $C_{pf}$ is calculated from the equation:

$$C_{pf} = \frac{\frac{\sum_{i=1}^{n} w_i \cdot c_i}{\sum_{i=1}^{n} w_i}}{\frac{\sum_{j=1}^{m} w_j \cdot c_j}{\sum_{j=1}^{m} w_j}},$$

where $c_i$ is the mole fraction comonomer content and $w_i$ is the normalized weight fraction as determined by GPC/FTIR for the n FTIR data points above the median molecular weight, $c_j$ is the mole fraction comonomer content and $w_j$ is the normalized weight fraction as determined by GPC/FTIR for the m FTIR data points below the median molecular weight, wherein only those weight fractions $w_i$ or $w_j$ which have associated mole fraction comonomer content values are used to calculate $C_{pf}$ and n and m are greater than or equal to 3; and where the molecular weight partitioning factor $M_{pf}$ is calculated from the equation:

$$M_{pf} = \frac{\frac{\sum_{i=1}^{n} w_i \cdot M_i}{\sum_{i=1}^{n} w_i}}{\frac{\sum_{j=1}^{m} w_j \cdot M_j}{\sum_{j=1}^{m} w_j}},$$

where $M_i$ is the viscosity average molecular weight and $w_i$ is the normalized weight fraction as determined by ATREF-DV for the n data points in the fractions below the median elution temperature, $M_j$ is the viscosity average molecular weight and $w_j$ is the normalized weight fraction as determined by ATREF-DV for the m data points in the fractions above the median elution temperature, wherein only those weight fractions, $w_i$ or $w_j$ which have associated viscosity average molecular weights greater than zero are used to calculated $M_{pf}$ and n and m are greater than or equal to 3.

49. The process of claim 48, which is a continuous gas phase polymerization process.

50. The process of claim 48, wherein the metallocene catalyst has a bis-Cp metallocene complex.

* * * * *

UNITED STATES PATENT AND TRADEMARK OFFICE
CERTIFICATE OF CORRECTION

PATENT NO.   : 6,462,161 B1
DATED        : October 8, 2002
INVENTOR(S)  : Larry D. Cady et al.

It is certified that error appears in the above-identified patent and that said Letters Patent is hereby corrected as shown below:

<u>Title page,</u>
Item [57], ABSTRACT,
Line 2, after "metallocene" delete the comma.
Line 3, after "reactor" insert -- in a process --.
Line 3, "polymer" should read -- polymerization --.
Lines 4 and 9, "molecule" should read -- molecular --.
Lines 8 and 9, "fact" should read -- factor --.
Line 13, after "have" delete the period .

<u>Column 40,</u>
Line 44, "$g/cm^2$" should read -- $g/cm^3$ --.

<u>Column 41,</u>
Line 63, after "to" insert -- 40 --.
Line 63, "complex" should read -- $\pi$-complex --.

<u>Column 42,</u>
Line 45, "Us" should read -- is --.

<u>Column 43,</u>
Line 8, "which-has" should read -- which has --.

Signed and Sealed this

Eighth Day of July, 2003

JAMES E. ROGAN
*Director of the United States Patent and Trademark Office*